(12) United States Patent
Choi

(10) Patent No.: US 12,202,091 B2
(45) Date of Patent: Jan. 21, 2025

(54) AUTOMATIC TOOL CHANGER AND CONTROL METHOD THEREFOR AND MACHINE TOOL INCLUDING SAME

(71) Applicant: DN SOLUTIONS CO., LTD., Changwon-si (KR)

(72) Inventor: Jaehyun Choi, Changwon-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 775 days.

(21) Appl. No.: 17/436,534

(22) PCT Filed: Mar. 9, 2020

(86) PCT No.: PCT/KR2020/003284
§ 371 (c)(1),
(2) Date: Sep. 3, 2021

(87) PCT Pub. No.: WO2020/184945
PCT Pub. Date: Sep. 17, 2020

(65) Prior Publication Data
US 2022/0168858 A1 Jun. 2, 2022

(30) Foreign Application Priority Data
Mar. 8, 2019 (KR) .................. 10-2019-0026676

(51) Int. Cl.
*B23Q 3/155* (2006.01)
*B23Q 3/157* (2006.01)
*B23Q 11/08* (2006.01)

(52) U.S. Cl.
CPC ...... *B23Q 3/15503* (2016.11); *B23Q 3/15506* (2013.01); *B23Q 2003/15537* (2016.11);
(Continued)

(58) Field of Classification Search
CPC .... Y10T 483/115; Y10T 483/1719–483/1726; Y10T 483/175;
(Continued)

(56) References Cited

U.S. PATENT DOCUMENTS 4,571,796 A * 2/1986 Sellner ............... B23Q 3/15766
29/27 R
4,610,074 A * 9/1986 Katsube ............... B23B 39/205
483/54

(Continued)

FOREIGN PATENT DOCUMENTS

CN 108857582 A * 11/2018 ......... B23Q 3/15706
CN 110216479 A * 9/2019 ............. B23P 23/02

(Continued)

OTHER PUBLICATIONS

English abstract for CN 110216479-A, which CN '479 was published Sep. 10, 2019.*

(Continued)

*Primary Examiner* — Erica E Cadugan
*Assistant Examiner* — Michael Vitale
(74) *Attorney, Agent, or Firm* — STIP Law Group, LLC

(57) ABSTRACT

The present disclosure relates to an automatic tool changer for a machine tool which can change a tool mounted on a tool post by moving both of a magazine and a tool post to be concentric in order to change a tool in a horizontal type machine tool such as a lathe or a horizontal type turning center; a method of controlling the automatic tool changer and a machine tool including the automatic tool changer.

14 Claims, 22 Drawing Sheets

(52) U.S. Cl.
CPC .............. *B23Q 2003/15586* (2013.01); *B23Q 3/15766* (2013.01); *B23Q 11/08* (2013.01); *Y10T 483/10* (2015.01); *Y10T 483/115* (2015.01); *Y10T 483/1719* (2015.01); *Y10T 483/1721* (2015.01)

(58) Field of Classification Search
CPC ................... Y10T 483/1767–483/1771; Y10T 483/1779; Y10T 483/1783–483/1795; Y10T 483/18; Y10T 483/1845–483/1855; B23Q 3/15506; B23Q 3/15566; B23Q 3/15753; B23Q 3/1576–3/15766; B23Q 2003/15537; B23Q 2003/15586
USPC ..... 483/3, 24–27, 37, 44–46, 49, 51–56, 58, 483/63–64
See application file for complete search history.

(56) References Cited

U.S. PATENT DOCUMENTS

| | | | | |
|---|---|---|---|---|
| 4,870,744 | A | * | 10/1989 | Araki ................. B23Q 3/15534 483/56 |
| 8,613,129 | B2 | * | 12/2013 | Li ............................ B23B 3/168 29/27 R |
| 11,440,150 | B1 | * | 9/2022 | Chen .................. B23Q 3/15536 |
| 11,660,715 | B2 | * | 5/2023 | Park ....................... B23Q 11/08 483/1 |
| 2005/0076757 | A1 | | 4/2005 | Kikuchi et al. |
| 2014/0090517 | A1 | * | 4/2014 | Suzuki ................... B23Q 16/06 74/814 |
| 2016/0193706 | A1 | * | 7/2016 | Kanda .................. B23Q 3/1554 483/58 |
| 2017/0066094 | A1 | * | 3/2017 | Hoshi ..................... B23B 41/02 |
| 2017/0304973 | A1 | * | 10/2017 | Koizumi ............ B23Q 3/15526 |
| 2018/0215001 | A1 | * | 8/2018 | Kasahara ........... B23Q 3/15713 |
| 2022/0339711 | A1 | * | 10/2022 | Kuriya .................... B23Q 3/155 |

FOREIGN PATENT DOCUMENTS

| | | | | |
|---|---|---|---|---|
| CN | 111376094 | A | * 7/2020 | .............. B23P 23/02 |
| EP | 1122023 | A1 | * 8/2001 | .............. B23B 3/162 |
| GB | 2021466 | A | * 12/1979 | .............. B23B 3/161 |
| JP | H11138374 | A | 5/1999 | |
| JP | 2013226631 | A | 11/2013 | |
| KR | 20150100217 | A | 9/2015 | |
| KR | 20180085434 | A | 7/2018 | |
| WO | WO-2006082982 | A1 | * 8/2006 | ......... B23Q 3/15706 |

OTHER PUBLICATIONS

International Search Report of PCT/KR2020/003284, Jun. 16, 2020, English translation.

* cited by examiner

*150:151,152,153
*160:161,162,163
*230:231,232,233
*170:210,220,230,240

*130:131,132,133,134,135,136

*140:150,160

AUTOMATIC TOOL CHANGER AND CONTROL METHOD THEREFOR AND MACHINE TOOL INCLUDING SAME

CROSS-REFERENCE TO RELATED APPLICATIONS

This application is the U.S. National Phase under 35 U.S.C. § 371 of International Application No. PCT/KR2020/003284 filed on Mar. 9, 2020, which in turn claims the benefit of Korean Application No. 10-2019-0026676 filed on Mar. 8, 2019, the disclosures of which are incorporated by reference into the present application.

FIELD OF THE DISCLOSURE

The present disclosure relates to an automatic tool changer and a control method therefore and a machine tool including same. More particularly, the present disclosure relates to an automatic tool changer for a machine tool which can change a tool mounted on a tool post by moving both of a magazine and a tool post to be concentric in order to change a tool in a horizontal type machine tool such as a lathe or a horizontal type turning center; a method of controlling the automatic tool changer and a machine tool including the automatic tool changer.

BACKGROUND OF THE DISCLOSURE

In general, a machine tool is a machine that is used to machine metal/non-metal workpieces into desired shapes and dimensions using appropriate tools through various cutting methods or non-cutting methods.

Various kinds of machine tools including a turning center, vertical/horizontal machining centers, a gantry-type machining center, a Swiss turn, a discharge machine, a horizontal type NC boring machine, a CNC lathe, a multi-tasking machine, etc. are widely used in accordance with the uses for corresponding work at various industrial sites.

The multi-tasking machine of these machine tools is a turning center equipped with multifunctional automatic tool changer (ATC) and tool machine that perform various types of machining such as turning, drilling, tapping, and milling. When a worker loads or changes a tool for machining in a multi-tasking machine, the worker manually mounts the tool on a tool magazine.

In general, various kinds of machine tools that are currently used are equipped with an operation panel to which an NC (numerical control) or CNC (computerized numerical control) technology is applied. Such an operation has various function switches or buttons and a monitor.

Further, machine tools include a table for seating a material, which is a workpiece, and feeding the workpiece for machining, a palette for preparing a workpiece before machining, a spindle for holding and rotating a tool or a workpiece, a tailstock for supporting a workpiece, etc. during machining, a work rest, etc.

In general, in machine tools, a table, a tool post, a spindle, a tailstock, a work rest, etc. have a feeding unit that feeds moving on a feeding shaft to perform various types of machining.

In general, machine tools use several tools for various types of machining, and a machine magazine or a turret is used in the type of a tool storage place receiving and holding several tools.

Such machine tools use several tools for various types of machining, and a machine magazine is used in the type of a tool storage place receiving and holding several tools.

Further, machine tools, generally, includes an APC (Automatic Palette Changer) to minimize the non-machining time. The ACP automatically changes a palette between a workpiece-machining region and a workpiece-setting region. A workpiece can be mounted on the palette.

Further, machine tools, generally, includes an ATC (Automatic Tool Changer) for taking or putting specific tools out of or into a tool magazine in response to instructions from a numerical controller so that their productivity is improved.

In general, machine tools, particularly, the types of tool magazines that are used in a machining center or a turning center, in broad meaning, can be classified into two kinds. One is a drum type tool magazine and the other one is a chain type tool magazine.

Further, the ATCs that are used in the related art are classified into an arm type and an armless type, depending on the way of clamping a tool.

In general, an armless ATC changes several tools, which are disposed at a magazine plate of a tool magazine, using only motions of a column and a spindle without a separate change arm, and is usually used in a vertical type machining center or a horizontal type turning center.

Further, machining tools, generally, are classified into, in broad meaning, a turning center and a machining center. The turning center includes a tool post for mounting several tools and indexing tools that are needed in machining, such as a turret.

In general, as for vertical turning centers of the related art, it is easy to change tools mounted on a tool post, so it is possible to automatically change tools mounted on the tool post using separation magazine and ATC.

However, as for horizontal type machine tools such as a lathe or a horizontal type turning center in the related art, since only 8~12 tools are mounted on a tool post, it is required to stop a machine tool, separate the existing tool, and then mount a new tool in order to change the tool mounted on the tool post when machining a workpiece that requires more tools. Accordingly, there is a problem that more time and manpower are consumed and workers feel inconvenient.

That is, horizontal type machine tools such as a lathe or a horizontal type turning center in the related art do not include neither a magazine for holding tools nor an ATC for automatically changing tools, so there is a problem that productivity decreases.

Further, according to horizontal type machine tools such as a lathe or a horizontal type turning center in the related art, the non-machining time increases, so productivity by the machine tools decreases, and safety and reliability of the machine tools are deteriorated.

Further, according to horizontal type machine tools such as a lathe or a horizontal type turning center in the related art, there is a problem that even if tools are manually changed, it is difficult to reduce the size of the machine tools because the magazine holding several tools is separately installed, the manufacturing cost of the machine tools increases, and spatial usability decreases.

Further, according to horizontal type machine tools such as a lathe or a horizontal type turning center in the related art, there is a problem that a worker may drop a tool when the worker manually changes long tools, so the tool is damaged, the maintenance cost is increased, and safety accidents are caused.

DISCLOSURE

Summary

The present disclosure has been made in an effort to solve the problems described above and an object of the present disclosure is to provide: an automatic tool changer for a machine tool which can reduce a non-machining time for changing tools, can have improved productivity, and can provide convenience for workers because a magazine and a tool post both are moved to be concentric in order to change tools mounted on the tool post and tools held on the magazine so that a machine tool, particularly, a horizontal type machine tool such as a lathe can perform various types of machining, the magazine is horizontally installed to be parallel with the tool post, and tools are disposed in the magazine to be parallel with the tool post, and a method of controlling the automatic tool changer.

Another object of the present disclosure is to provide an automatic tool changer that enables various types of machining and small-sizing of a machine tool, can maximize expandability and convenience of a machine tool through various types of machining, can reduce the cost and time for maintaining the automatic tool changer and a machine tool, and can maximize machinability of a machine tool by minimizing the non-machining time.

In order to achieve the objects of the present disclosure, an automatic tool changer of a machine tool according to the present disclosure includes: a base installed on a spindle; a support movably installed on the base; a magazine configured to hold a plurality of tools and movably installed on the support; and a moving mechanism configured to move the support and the magazine, wherein both of the magazine and the tool post installed on a bed may be moved close to each other when tools are exchanged.

In another preferred embodiment of the automatic tool changer of a machine tool according to the present disclosure, the magazine of the automatic tool changer of a machine tool may be horizontally installed to be parallel with the tool post, and tools held on the magazine may be horizontally disposed to be parallel with the tool post.

In another preferred embodiment of the automatic tool changer of a machine tool according to the present disclosure, the base of the automatic tool changer of a machine tool may include a coupling part formed over the spindle.

In another preferred embodiment of the automatic tool changer of a machine tool according to the present disclosure, the base of the automatic tool changer of a machine tool may further include an inclination part formed over the spindle in parallel with or at an angle with respect to a vertical feeding axis of the tool post, and the coupling part may be installed on the inclination part.

In another preferred embodiment of the automatic tool changer of a machine tool according to the present disclosure, the moving mechanism of the automatic tool changer of a machine tool may include: a first moving assembly formed on the base in parallel with a horizontal feeding axis of the tool post and configured to straightly reciprocate the support; and a second moving assembly formed to cross the first moving assembly at a right angle on the support and configured to straightly reciprocate the magazine.

In another preferred embodiment of the automatic tool changer of a machine tool according to the present disclosure, the magazine of the automatic tool changer of a machine tool may include: a body coupled to the second moving assembly; a rotary shaft elongated from the body in parallel with the horizontal feeding axis and rotatably installed; a tool holder having a plurality of grippers configured to hold a plurality of tools circumferentially around a rotation center of the rotary shaft, coupled to the rotary shaft, and configured to be rotated by rotation of the rotary shaft; and a rotator configured to generate power for rotating the rotary shaft.

In another preferred embodiment of the automatic tool changer of a machine tool according to the present disclosure, the automatic tool changer of a machine tool may include a tool holder configured to support tools held on the magazine by moving independently from the magazine when tools are exchanged.

In another preferred embodiment of the automatic tool changer of a machine tool according to the present disclosure, the tool support of the automatic tool changer of a machine tool may include: a guide formed in parallel with the horizontal feeding direction of the tool post, close to the base, and in parallel with the base; a slider installed to be movable on the guide; a third moving assembly formed on the guide in parallel with the horizontal feeding direction of the tool post, and configured to straightly reciprocate the slider; and an elevator installed on the slider to be movable up and down, and configured to horizontally maintain a tool, which is sent to or taken out of the magazine, when tools are exchanged.

In another preferred embodiment of the automatic tool changer of a machine tool according to the present disclosure, the elevator of the automatic tool changer of a machine tool may include: a housing formed on the slider; a rod installed in the housing to be movable up and down; a compensator coupled to an end of the rod and configured to prevent sagging of a tool that is put into or taken out of a gripper of the magazine; and a fourth driver configured to generate power for moving up and down the rod.

In another preferred embodiment of the automatic tool changer of a machine tool according to the present disclosure, the magazine of the automatic tool changer of a machine tool may further include a checker configured to check whether a tool is clamped when tools are exchanged.

In order to achieve another object of the present disclosure, a method of controlling an automatic tool changer according to the present disclosure may include: a step wherein a tool post and a magazine are horizontally moved close to each other; a step wherein the magazine is moved forward in the direction of an inclination axis so that a gripper for clamping a machining tool of the magazine clamps a tool mounted on the tool post; a step wherein the tool post is horizontally moved away from the magazine to unclamp the machining tool; a step wherein the magazine is rotated so that a gripper holding a replacement tool is positioned at an exchange position; a step wherein the tool post is horizontally moved back close to the magazine to clamp the replacement tool; a step wherein the magazine is moved backward in the direction of the inclination axis so that the gripper clamping the replacement tool of the magazine unclamps the replacement tool to be mounted onto the tool post; and a step wherein the tool post and the magazine are moved away from each other.

In another preferred embodiment of the method of controlling an automatic tool changer according to the present disclosure, the method of controlling an automatic tool changer may further include: a step wherein the tool support is moved up to support the machining tool clamped by a machining tool gripper of the magazine after the step wherein the magazine is moved forward in the direction of the inclination axis; a step wherein the tool support is moved down after the step in which the tool post is horizontally moved away from the magazine; a step wherein the tool support is moved up again to support the replacement tool clamped by a gripper of the magazine after the step wherein the tool post is horizontally moved back close to the magazine; and a step wherein the tool support is moved down again after the step wherein the magazine is moved backward in the direction of the inclination axis.

In another preferred embodiment of the method of controlling an automatic tool changer according to the present disclosure, the method of controlling an automatic tool changer may further include: a step wherein the door unit is opened; and a step wherein the door unit is closed after the magazine and the tool post are horizontally moved away from each other.

In order to achieve another object of the present disclosure, a machine tool including an automatic tool changer of a machine tool according to the present disclosure may include the automatic tool changer of any one of claims 1 to 5 of the present disclosure.

In another preferred embodiment of the machine tool including an automatic tool changer according to the present disclosure, the machine tool including an automatic tool changer may include: a bed; a spindle installed on the bed and configured to rotate a workpiece; a tool post on which a tool is mounted, that is movably installed on the bed, and that is configured to machine the workpiece; an actuating mechanism configured to feed the tool post; a cover configured to separate a machining region, wherein the workpiece is machined, and a non-machining region; and a door unit installed on the cover to be able to open and close by sliding.

The automatic tool changer of a machine tool according to the present disclosure, the method of controlling the automatic tool changer, and the machine tool including the automatic tool changer provide an effect that when a tool mounted on the tool post and a tool held on the magazine are exchanged, the magazine and the tool post both are moved to be concentric, the magazine is horizontally installed to be parallel with the tool post, and tools are horizontally disposed on the magazine to be parallel with the tool post, so the tool mounted on the tool post and a tool held on the magazine are automatically quickly exchanged, thereby being able to reduce the time and manpower for exchanging tools and perform various types of machining.

The automatic tool changer of a machine tool according to the present disclosure, the method of controlling the automatic tool changer, and the machine tool including the automatic tool changer provide an effect that since the method of controlling the automatic tool changer according to the present disclosure automatically quickly exchanges a tool held on the magazine and the tool mounted on the tool post, the non-machining time of the machine tool is minimized, and accordingly, it is possible to maximize the productivity by the machine tool, improve reliability and stability of the machine tool, and improve convenience for workers.

The automatic tool changer of a machine tool according to the present disclosure, the method of controlling the automatic tool changer, and the machine tool including the automatic tool changer provide an effect that since the magazine holding various tools that can be changed is moved, it is possible to reduce the size of the machine tool, reduce the manufacturing cost of the machine tool, increase spatial usability, and improve a feeling of satisfaction of consumers.

The automatic tool changer of a machine tool according to the present disclosure, the method of controlling the automatic tool changer, and the machine tool including the automatic tool changer have an effect that since even long tools are automatically stably replaced, it is possible to prevent safety accident due to drop of a tool, etc. Further, the automatic tool changer is installed in the non-machining region, damage or breakage due to chips, cutting oil, or the like are prevented, whereby it is possible to reduce the maintenance cost and maintenance time.

DESCRIPTION OF MAIN REFERENCE NUMERALS OF DRAWINGS

Figure 1:
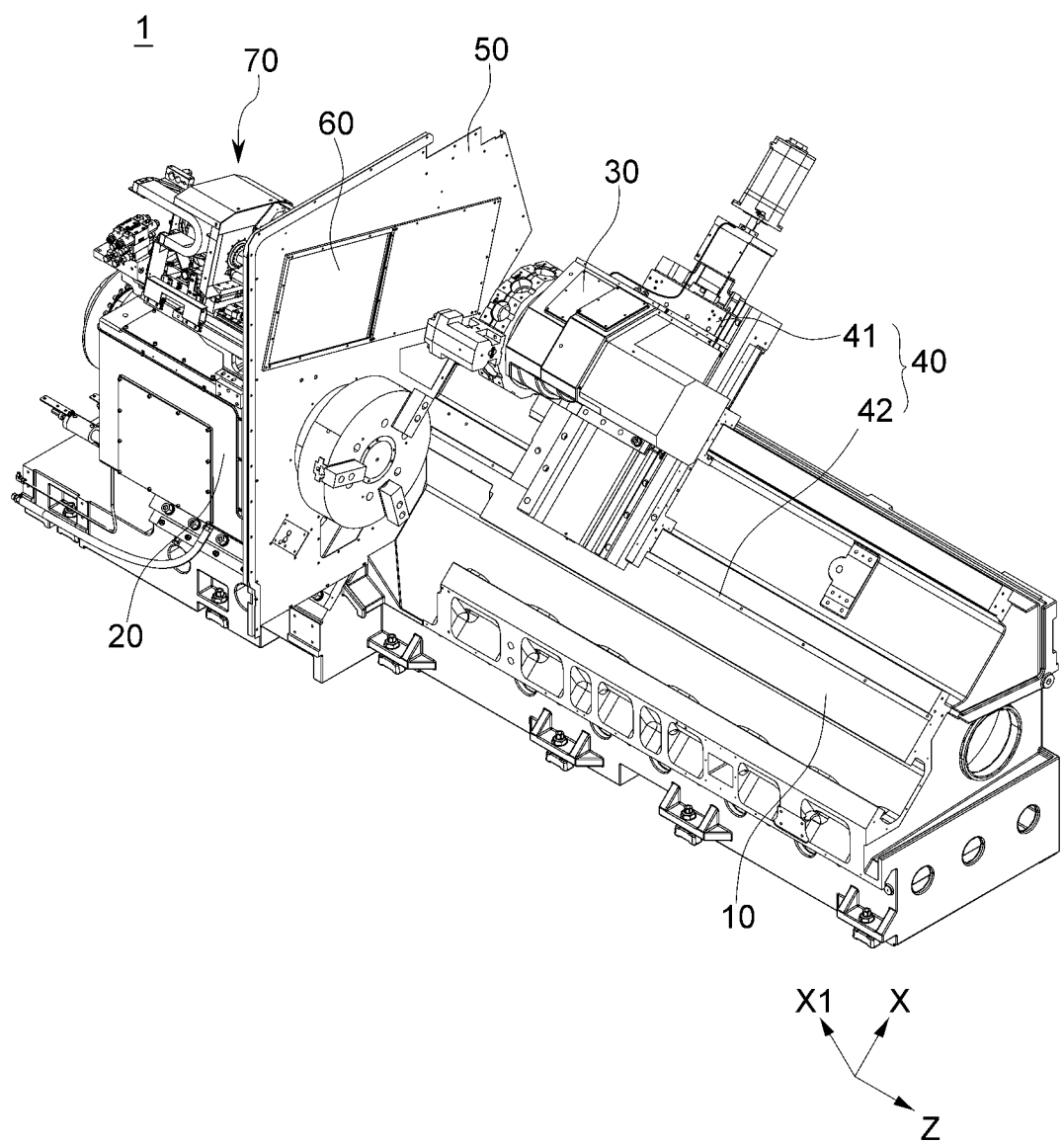
FIG. 1 is a perspective view of a machine tool including an automatic tool changer according to the present disclosure.

1: Machine tool
2: Machining tool
3: Replacement tool
10: Bed
20: Spindle
30: Tool post
40: Actuating mechanism
50: Cover
60: Door unit
70: Automatic tool changer
110: Base
120: Support
130: Magazine
140: Moving mechanism
150: First moving assembly
160: Second moving assembly
170: Tool support
210: Guide
220: Slider
230: Third moving assembly
240: Elevator

DETAILED DESCRIPTION OF CERTAIN INVENTIVE EMBODIMENT

Hereafter, an automatic tool exchanger according to an embodiment of the present disclosure, a method of controlling the automatic tool exchanger, and a machine tool including the automatic tool exchanger are described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. The sizes, thicknesses, etc.

of devices may be exaggerated for convenience in the drawings. Like reference numerals indicate the same components throughout the specification.

Advantages and features of the present Disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 2:
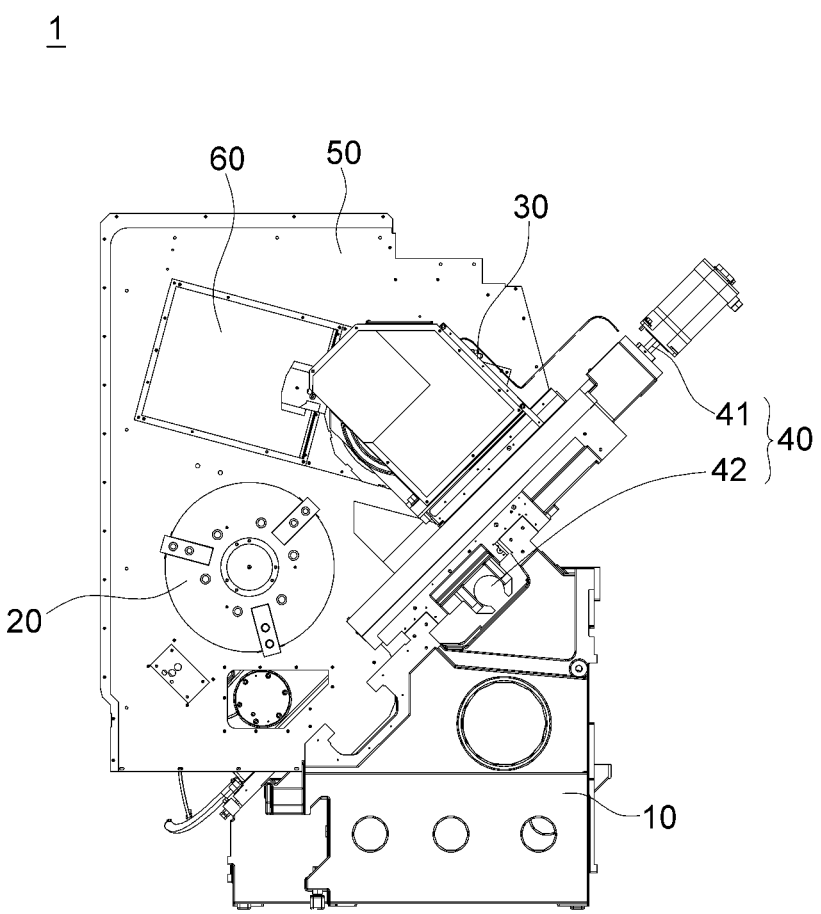
FIG. 2 is a right side view of FIG. 1.
Figure 3:
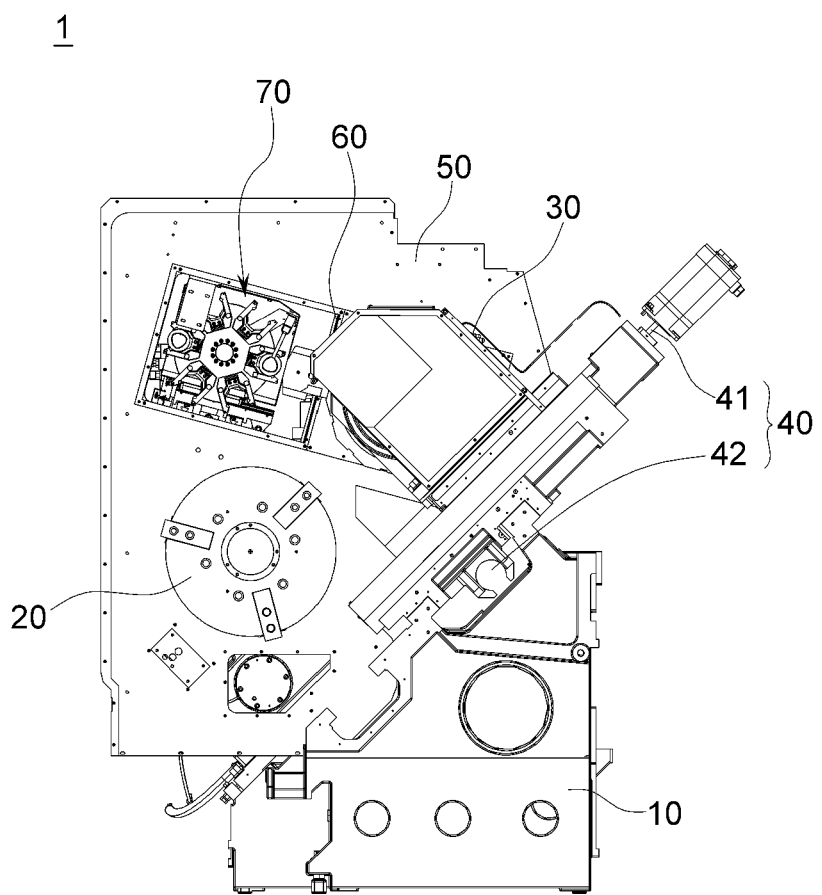
FIG. 3 is a right side view of FIG. 1 with a door unit open.
Figure 4:
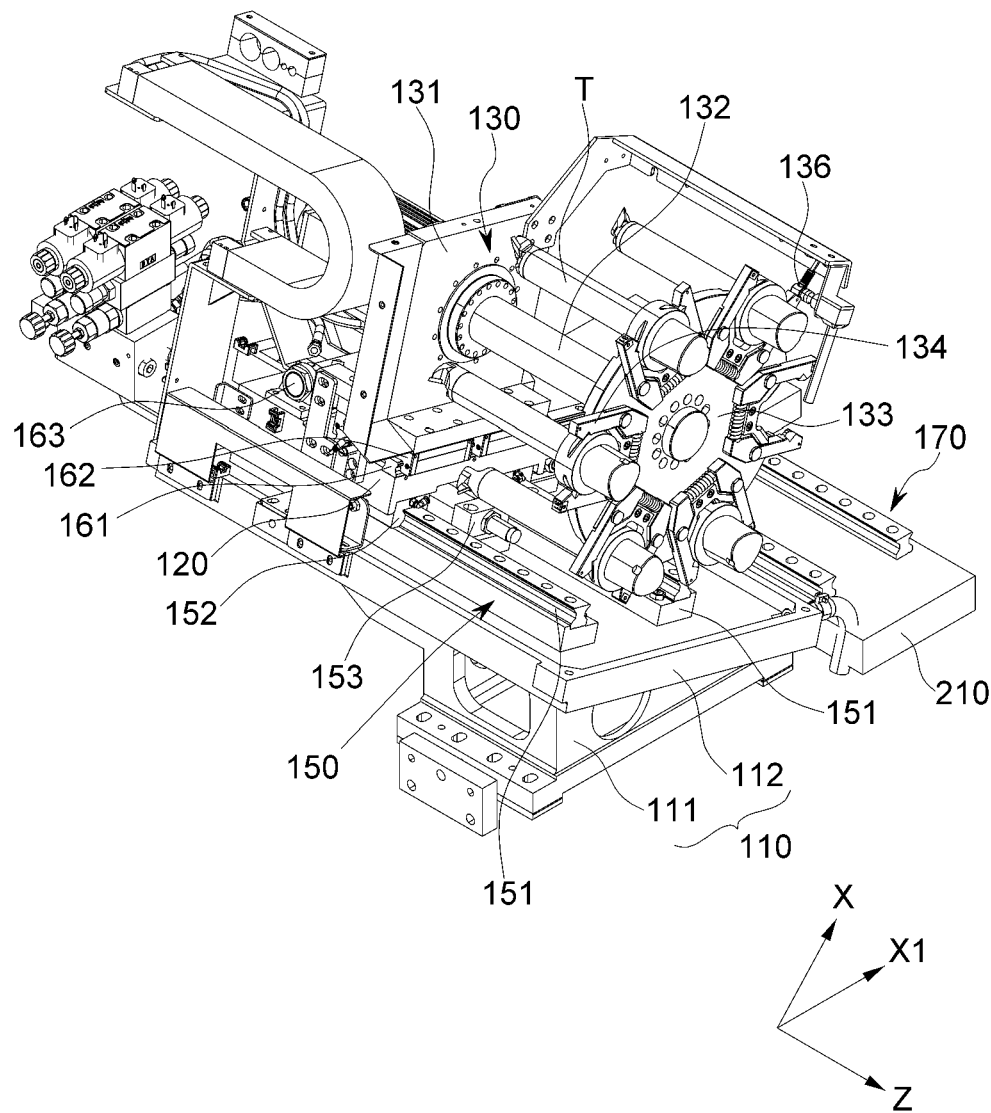
FIG. 4 is a front perspective view of the automatic tool changer according to the present disclosure.
Figure 5:
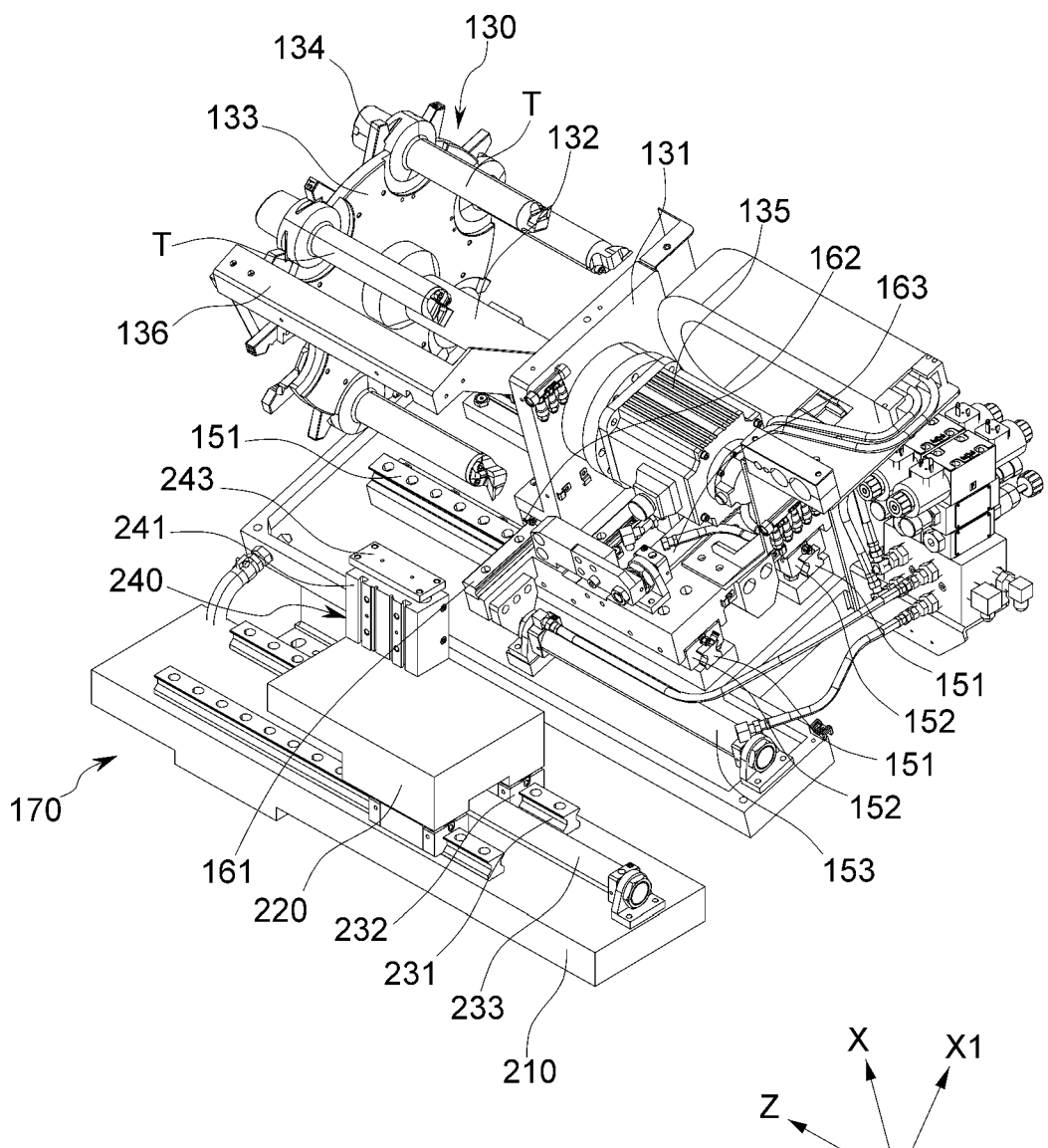
FIG. 5 is a rear perspective view of the automatic tool changer according to the present disclosure.
Figure 6:
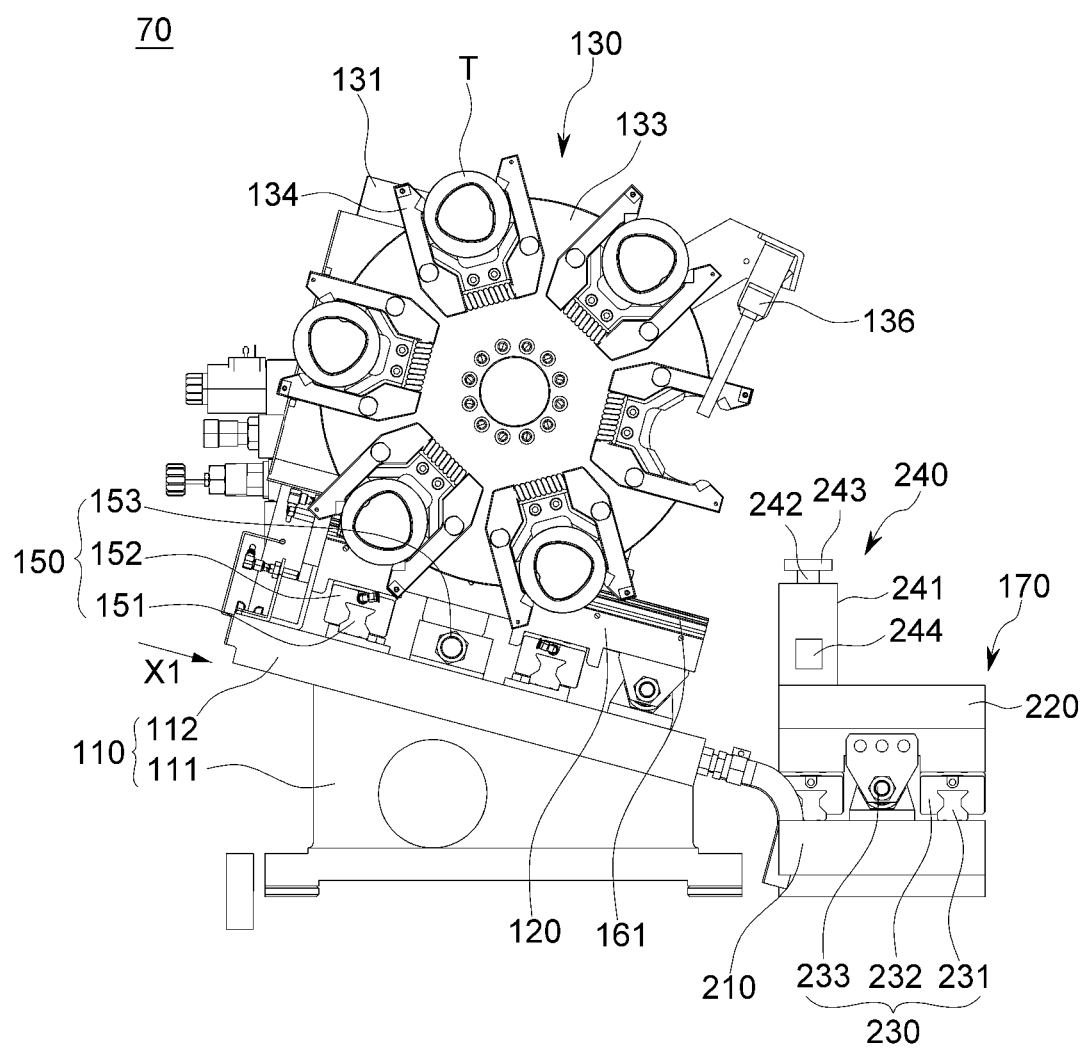
FIG. 6 is a front view of the automatic tool exchanger according to the present disclosure.

FIG. 1 is a perspective view of a machine tool including an automatic tool changer according to the present disclosure, FIG. 2 is a right side view of FIG. 1, and FIG. 3 is a right side view of FIG. 1 with a door unit open. FIG. 4 is a front perspective view of the automatic tool changer according to the present disclosure, FIG. 5 is a rear perspective view of the automatic tool changer according to the present disclosure, and FIG. 6 is a front view of the automatic tool exchanger according to the present disclosure. FIGS. 7 to 21 show an operation process of changing tools by a machine tool including the automatic tool changer according to the present disclosure. FIG. 22 is a flowchart showing a method of controlling the automatic tool changer according to the present disclosure.

The terms used below are defined as follows. The term "horizontal direction" or "horizontal feeding axis" is means a horizontal direction in the same member, that is, the Z-axial direction in FIGS. 1 to 21; the term "vertical direction" or "vertical feeding axis" means a vertical direction in the same member orthogonal to the horizontal direction, that is, the X-axial direction in FIGS. 1 to 21; and an "inclined-axial direction" or "inclined-axial direction feeding axis" is a direction that has a predetermined angle with respect to the vertical direction and wherein a magazine and a tool post, which will be described below, are moved to be concentric, that is, the X1-axial direction in FIGS. 4 to 21. Further, the term "up (top)" means a direction going up, that is, a direction facing up on the paper surface in FIGS. 1 to 21, and the term "down (bottom)" means a direction going down, that is, a direction facing down on the paper surface of FIGS. 1 to 21.

Further, the term "in (inside)" means the side relatively close to the center in the same member, that is, the inside in FIGS. 1 to 21, and the term "out" means the side relatively far from the center in the same member, that is, the outside in FIGS. 1 to 21. Further, the term "front" means the side close to a cover and the term "rear" means the side far from the cover.

Further, the term "machining region" is a region wherein a workpiece is mounted on the chuck of a spindle and machining is performed by a tool, that is, a space wherein a tool post is moved inside a cover, and the term "non-machining region" is a region wherein machining by a tool is not performed, that is, a space to which a tool post cannot be moved.

A machine tool including an automatic tool changer according to the present disclosure is described with reference to FIGS. 1 to 3. A machine tool including an automatic tool changer according to the present disclosure includes a bed 10, a spindle 20, a tool post 30, an actuating mechanism 40, a cover 50, a door unit 60, and an automatic tool changer 70. The configuration and features of the automatic tool changer 70 will be described below. That is, features of the machine tool are mainly described other than the automatic tool changer 70 to be described below.

The bed 10 is installed on the ground or a base. The bed 10 functions as a support for machining workpieces and provides the functions of a space and a support for installing parts required to machine workpieces. The longitudinal direction of the bed, that is, a horizontal feeding axis corresponds to a Z-axis.

The spindle 20 is installed on the bed 10 and rotates a workpiece. In detail, the spindle 20 is installed on a portion of the bed and a workpiece is mounted on a chuck installed at the front end of the spindle, whereby a workpiece is rotated by rotation of the spindle. The spindle is protected by a spindle housing. A spindle body is positioned in a non-machining region by the cover 50 and the chuck is positioned in a machining region.

A tool is mounted on the tool post 30 to machine a workpiece and the tool post 30 is movably installed on the bed 10. That is, as described above, the tool post 30 can be moved in the horizontal direction of the bed by a first actuator 41 of the actuating mechanism 40 to be described below, and this movement direction corresponds to the horizontal feeding axis (Z-axis). The tool post 30 is vertically moved along a cross slider for various types of machining by a second actuator 42 of the actuating mechanism 40 to be described below, and this vertical feeding axis corresponds to an X-axis. That is, the tool post can be vertically moved by the second actuator 41.

The actuating mechanism 40 feeds the post tool. The actuating mechanism 40 includes the first actuator 41 and the second actuator 42. The first actuator 41 straightly reciprocates the tool post 30 in the Z-axial direction (horizontal feeding axis) and the second actuator 42 straightly reciprocates the tool post 30 in the X-axial direction (vertical feeding axis).

The cover 50 separates the machining region, wherein a workpiece is machined, and the non-machining region. That is, the spindle body and the automatic tool changer are installed in the non-machining region, and the tool post and the actuating mechanism are installed in the machining region. The tool post is movably installed in the machining region.

The door unit 60 is installed on a portion of the cover to be able to open and close by sliding. The automatic tool changer and the tool post change a tool when the door unit 60 is opened, and a workpiece is machined after the door unit 60 is closed, which will be described below, so chips or cutting oil is prevented from flying to the non-machining region, whereby the spindle and the automatic tool changer are protected and prevented from being damaged or broken. Accordingly, it is possible to reduce the cost and time for maintaining the machine tool and increase the lifespan of the machine tool by improving durability.

The automatic tool changer 70 is installed over the spindle 20. That is, the automatic tool changer 70 is installed in the non-machining region to be positioned over the housing of the spindle.

Accordingly, it is possible to reduce the size of the machine tool including the automatic tool changer according to the present disclosure, reduce the manufacturing cost of the machine tool, increase spatial usability, and improve a feeling of satisfaction of consumers.

An automatic tool changer of a machine tool according to the present disclosure is described with reference to FIGS. 1 to 21. The automatic tool changer 70 of a machine tool according to the present disclosure includes a base 110, a support 120, a magazine 130, a moving mechanism 140, and a tool support 170. Though not shown in the figures, the automatic tool changer 70 of a machine tool according to the present disclosure may further include a controller.

The base 110 forms an external shape at which various components of the automatic tool changer 70 can be installed. The base 110 is installed at the spindle 20. In detail, the base 110 is installed over the housing of the spindle 20 installed in the non-machining region.

Though not necessarily limited thereto, as shown in FIGS. 4 to 6, the base 110 includes a coupling part 112 formed at the upper portion of the base. More preferably, the base 110 includes an inclination part 111 and a coupling part 112 installed above the inclined part.

The inclination part 111 is formed over the spindle 20 in parallel with or at an angle with respect to the vertical feeding axis (X-axis) of the tool post 30. That is, the inclination part 111 is inclined at a predetermined angle with respect to the vertical feeding axis so that the magazine 130 forms an inclination axis (X1-axis) with respect to the vertical feeding axis (X-axis) of the tool post 30 in order to make the magazine 130 and the tool post 30 be concentric when tools are exchanged. Accordingly, the magazine and the tool post become concentric when tools are exchanged, so it is possible to change the tool automatically quickly. Further, the size of the automatic tool charger is reduced, so the entire machine tool can be made compact.

The coupling part 112 is fixed over the inclination part 111. That is, the coupling part 112 is formed in a plate shape and is fixed over the inclination part 111, and the support, the magazine, and the moving mechanism to be described bellow are installed on the coupling part 112. When there is no inclination part, the coupling part may be formed perpendicular to the horizontal direction over the spindle.

The support 120 is movably installed on the base 110. That is, the support 120 is installed on the base 110 to be movable in parallel with the horizontal feeding axis (Z-axis) of the tool post 30 by the moving mechanism 140. In detail, the support 120 is installed on the base 110 such that it can be straightly reciprocated in the Z-axial direction by a first moving assembly 140.

The magazine 130 holds a plurality of tools T and is movably installed on the support 120. That is, the magazine 130 is movably installed on the support 120 at a predetermined angle with respect to the vertical feeding axis (X-axis) of the tool post. In detail, the magazine 130 is installed on the support 120 such that it can be straightly moved by a second moving assembly 160 along the inclination axis (X1-axis) inclined at a predetermined angle with respect to the vertical feeding axis (X-axis).

The moving mechanism 140 moves the support 120 and the magazine 130.

The tool support 170 moves horizontally (in the Z-axial direction) and supports the tools held on the magazine 130 independently from the magazine 130 when tools are exchanged. That is, when a machining tool mounted on the tool post is put into a gripper of the magazine or a replacement tool held by another gripper of the magazine is taken out to the tool post in order to change a tool, the tool support 170 horizontally moves independently from the magazine 130 and supports the machining tool or the replacement tool, thereby compensating for sagging of relatively long tools. Accordingly, tools can be stably changed. Accordingly, a tool is accurately mounted on the tool post, the machining precision of the machine tool can be improved and vibration or noise can be reduced. Further, it is possible to increase the lifespan of tools by preventing wear of or damage to the tools.

When a replacement tool 3 held on the magazine and a machining tool 2 mounted on the tool post are exchanged, the magazine 130 and the tool post 30 installed on the bed 10 are both moved close to each other to be concentric by the moving mechanism and the actuating mechanism.

The magazine 130 is horizontally installed to be parallel with the tool post 30. That is, the magazine 130 is installed in the Z-axial direction.

The tools T held on the magazine 130 are horizontally arranged to be parallel with the tool post 30. That is, when a tool is put into or taken out of each gripper 134 of the magazine 130, the tool is put in or taken out in the Z-axial direction that is the horizontal direction. As a result, tools are held on the magazine 130 in parallel with the Z-axial direction that is the horizontal direction.

Accordingly, the automatic tool changer according to the present disclosure automatically quickly exchanges the tool mounted on the tool post and the tools held on the magazine. Therefore, the time and manpower for changing tools are reduced, and it is possible to expand the application field of a machine tool because it is possible to perform various types of machining. Further, it is possible to maximize the productivity by a machine tool by minimizing the non-machining time of the machine tool, improve reliability and stability, and reliability and stability of a machine tool, and provide convenience for workers.

The controller controls the operation of the tool post, the actuating mechanism, the door unit, the moving mechanism, the magazine, and the tool support to exchange the replacement tools held by the grippers of the magazine and the machining tool mounted on the tool post.

Though not necessarily limited thereto, the controller may include a machining program storage, a magazine position storage, a post tool position storage, a tool change instructor, and a determiner.

Though not shown in the figures, according to a preferred embodiment of the present disclosure, the controller includes a main operating unit. The main operating unit includes a display program and a data input program depending on display selection, displays a software switch in accordance with output from the display program, and gives input/output instructions of mechanical operation by recognizing on/off of the software switch.

Though not necessarily limited thereto, the main operating unit includes a monitor installed in a housing or a case or on a side of the machine tool and being able to display various function switches or buttons and various items of information.

A machining program for machining workpieces is stored in the machining program storage. That is, the machining program storage provides a human-machine interface for a worker to input machining programs for machining workpieces. A worker inputs one or more workpieces machining programs using the machining program storage.

The machining program storage includes a numerical controller and the numerical controller receives a machining program stored in the machining program storage, inputs parameters for machining a workpieces, and creates a machining route. The numerical controller includes NC (numerical control) or CNC (computerized numerical control) and has various numerical control programs therein. That is, the numerical controller has a driving program for a driving unit of the actuating mechanism, the moving mechanism, the magazine, and the tool support and an operation program for tools therein, and a corresponding program is automatically loaded and executed by driving of the numerical controller. The numerical controller communicates with the machining program storage, the magazine position storage, the tool post position storage, the tool change instructor, the determiner, and a PLC under predetermined protocols.

The machining program storage keeps reference values about the number of tools and the order of tools required for machining workpieces in the machining programs stored in the machining program storage. The reference values may be changed in accordance with the kind of a workpiece, the number of grippers installed at a corresponding magazine, and the size and kind of the workpiece that is mounted on the chuck at the front end of the spindle. The reference values may be designated by a worker through an input unit, if necessary, and may be automatically calculated and stored in accordance with corresponding data and machining program. Accordingly, it is possible to minimize the tool change time by positioning a gripper holding a tool to be used in the next process to a standby position.

The magazine position storage keeps the initial position of the magazine when the magazine is in a standby state for change a tool, the standby position of the magazine where the gripper of a replacement tool is positioned, and an exchange position where the machining tool on the tool post is substantially gripped.

The tool post position storage keeps a setup position where the tool post is positioned close to the door unit, aligns a machining tool to be changed in position, and horizontally moves forward to the door unit, and a preparation position where the tool post returns the machining tool and moves backward in the Z-axial direction to clamp a replacement tool. That is, two values for the setup position and the preparation position are stored to quickly change a tool. However, various positions may be stored, depending on the sizes and lengths of tools.

The tool change instructor transmits a tool change instruction in accordance with the machining order of a workpiece by communicating with the machining program storage, magazine position storage, and the tool post position storage.

The actuating mechanism, the moving mechanism, the magazine, and the tool support are driven in response to the instruction signal from the tool change instructor, whereby tool change is performed.

The determiner determines whether a signal from a checker 136 is normal about whether a gripper of the magazine normally claps or unclamps a machining tool and whether a replacement tool is normally clamped or unclamped at the tool post when tools are exchanged in response to a signal from the tool change instructor. When there is a problem, the determiner transmits a signal to the controller and the controller informs a worker or a user of a problem with the equipment by showing the problem to the outside through the monitor, etc., thereby being able to malfunction.

Though not necessarily limited thereto, an exchanger includes a PLC (Programmable Logic Controller). The PLC communicates with the machining program storage, the magazine position storage, the tool post position storage, the tool change instructor, the determiner, the actuating mechanism, the moving mechanism, the magazine, and the tool support under predetermined protocols, and performs a control instruction through this communication. That is, the PLC operates in response to a control instruction based on the control program of the numerical controller or the controller. Preferably, the PLC can measure the number of revolutions, torque, or the operation state of a cylinder using an encoder of the driving unit for the tool support, the moving mechanism, the actuating mechanism, and the magazine. Accordingly, the PLC can measure the current positions of the tools held by a plurality of grippers, automatically move the gripper holding the replacement tool to be used for the next machining in accordance with a machining program or can quickly operate the tool support in accordance with the state. Though not necessarily limited thereto, a rotator of the driving unit of the magazine is a motor or a servo motor and the operation of the rotor is controlled by the PLC and the controller.

Though not shown in the figures, the controller 1000 of the machine tool according to the present disclosure may further include an input unit and an output unit.

The input unit is installed in the type of a switch, a button, or the like on an operation panel, or the like, so a worker can easily input the initial position, the standby position, the exchange position, the gripping position of a tool, etc.

The display can display the result obtained by the determiner of the controller, the current position of the automatic tool changer, the position of the magazine, the number of the tool as the standby position, the machining program that is current being executed, the number of the tool as the setup position of the tool post, etc. Accordingly, a worker visually checks the current state of the equipment and checks and examines whether there is a problem with the equipment, whereby it is possible to reduce the maintenance cost and prevent safety accidents.

When a tool is not normally clamped or unclamped at a gripper of the magazine or at the tool post as the result of determination by the determiner, the display gives a warning to a worker by displaying an alarm, whereby it is possible to prevent a waste of workpieces and tools from being damaged or broken. The alarm may be generated a type that is displayed on the monitor, or in the type of a warning sound or a flashing light. Though not necessarily limited thereto, the display may be an LCD, LED, or PDP monitor.

As shown in FIGS. 4 to 21, the moving mechanism 140 of the automatic tool changer according to the present disclosure includes the first moving assembly 150 and the second moving assembly 160.

The first moving assembly 150 is formed on the base 110 in parallel with the horizontal feeding axis (Z-axis) of the tool post and straightly reciprocates the support. That is, the first moving assembly 150 is installed on the coupling part and straightly reciprocates the support 120 along the Z-axis in response to a signal from the controller when tools are exchanged.

As shown in FIGS. 4 to 21, the first moving assembly 150 of the automatic tool changer according to the present disclosure includes a first linear guide 151, a first linear guide block 152, and a first driver 153.

The first linear guide 151 is installed on the coupling part 112 in parallel with the horizontal feeding axis (Z-axis) of the tool post, that is, the first linear guide 151 is elongated in the Z-axial direction on the coupling part.

The first linear guide block 152 is installed to be movable along the first linear guide 151. The first linear guide block 152 is coupled to the support 120 and a plurality of first linear guide blocks is installed on the first linear guide, thereby performing a function of supporting and reciprocating the support 120 in the Z-axial direction.

The first driver 153 generates power for straightly reciprocating the support 120 along the first linear guide.

The second moving assembly 160 is formed to cross the first moving assembly 150 at a right angle on the support 120 and straightly reciprocates the magazine 130. That is, the second moving assembly 160 is installed on the support 120 and straightly reciprocates the magazine 130 along the inclination axis (X1-axis) in response to a signal from the controller when tools are exchanged.

As shown in FIGS. 4 to 21, the second moving assembly 160 of the automatic tool changer according to the present disclosure includes a second linear guide 161, a second linear guide block 162, and a second driver 163.

The second linear guide 161 is installed on the support 120 to cross the horizontal feeding axis (Z-axis) of the tool post at a right angle and to be inclined with respect to the vertical feeding axis (X-axis) of the tool post. That is, the second linear guide 161 is elongated in the inclination angle (X1-axis) on the support 120 to be inclined with respect to the X-axis.

The second linear guide block 162 is installed to be movable along the second linear guide 161. The second linear guide block 162 is coupled to the magazine 130 and a plurality of second linear guide blocks is installed on the second linear guide, thereby performing a function of supporting and reciprocating the magazine 130 in the X1-axial direction (in the direction of the inclination axis).

The second driver 163 generates power for straightly reciprocating the magazine 130 along the second linear guide.

The first linear guide 151 and the second linear guide 161 may be formed in LM guide types. The first driver 153 and the second driver 163 each may be composed of a ball screw and a servo motor. If necessary, the first driver 153 and the second driver 163 may be hydraulic or pneumatic cylinders.

As described above, since the magazine is straightly moved along the Z-axis and the X1-axis by the first moving assembly and the second moving assembly and the tool post is straightly moved along the Z-axis and the X-axis by the first actuator and the second actuator of the actuating mechanism, the magazine and the tool post become concentric when tools are exchanged. Accordingly, a tool is automatically quickly changed, so the tool change time is reduced. As a result, the non-machining time is decreased, so the productivity by the machine tool can be maximized.

As shown in FIGS. 4 to 21, the magazine 130 of the automatic tool changer according to the present disclosure includes a body 131, a rotary shaft 132, a tool holder 133, a plurality of gripper 134, a rotator 135, and a checker 136.

The body 131 is coupled to the second linear guide blocks of the second moving assembly. The body 131 is made of metal, is installed on the second linear guide blocks 162, and stably supports the magazine 130. The body 131 is vertically installed on the second linear guide blocks such that the magazine 130 is installed in parallel with the horizontal direction of the tool post, as described above.

The rotary shaft 132 is elongated horizontally from a side of the body 131. That is, the rotary shaft 132 is elongated from the body in the Z-axial direction in parallel with the horizontal feeding axis (Z-axis) and is installed on the body 131 to be rotatably by the rotator.

The tool holder 133 has a plurality of grippers 134 for holding a plurality of tools T circumferentially around the rotation center of the rotary shaft 132. The tool holder 133 is coupled to the rotary shaft 132 and is rotated by rotation of the rotary shaft. Though not necessarily limited thereto, the tool holder 133 may be formed in a disc shape.

The rotator 135 generates power for rotating the rotary shaft 132. The rotator 135 may be a servo motor.

The checker 136 checks whether a gripper that clamps a machining tool or a gripper that clamps a replacement tool and a tool mount of the tool post normally clamp a tool when tools are exchanged. The checker 136 is provided in a sensor type and transmits a checking signal to the controller, whereby accuracy and reliability for changing a tool are secured and tools are prevented from being damaged or broken.

As described above, according to the automatic tool changer of a machine tool of the present disclosure, since the magazine holding various tools that can be changed is moved and is installed over the spindle, it is possible to decrease the size of the machine tool, reduce the manufacturing cost of the machine tool, increase spatial usability, and improve satisfaction of customers.

As shown in FIGS. 4 to 21, the tool support 170 of the automatic tool changer 70 according to the present disclosure includes a guide 210, a slider 220, a third moving assembly 230, and an elevator 240.

The guide 210 forms the external shape of the tool support 170 and is formed in a plate shape. The guide 210 is formed in parallel with the horizontal feeding axis (Z-axis) of the tool post 30, adjacent to the base 110, and in parallel with the base.

The slider 220 is installed to be movable on the guide 210.

The third moving assembly 230 is formed on the guide 210 in parallel with the horizontal feeding axis (Z-axis) of the tool post 30 and straightly reciprocates the slider 220. That is, the third moving assembly 230 is formed on the guide 210 in parallel with the Z-axial direction to be parallel with the first moving assembly and operates to reciprocate the slider 220 in the Z-axial direction in response to a signal from the controller.

As shown in FIGS. 4 to 6, the third moving assembly 3 of the tool support 170 of the automatic tool changer according to the present disclosure includes a third linear guide 231, a third linear guide block 232, and a third driver 233.

The third linear guide 231 is installed on the guide 210 in parallel with the horizontal feeding axis (Z-axis) of the tool post. That is, the third linear guide 231 is elongated in the Z-axial direction on the guide 210.

The third linear guide block 232 is installed to be movable along the third linear guide 231. The third linear guide block 232 is coupled to the slider 220 and a plurality of third linear guide blocks is installed on the third linear guide, thereby performing a function of supporting and reciprocating the slider 220 in the Z-axial direction (in the direction of the horizontal feeding axis).

The third driver 233 generates power for straightly reciprocating the slider 220 along the third linear guide.

The third linear guide 231 may be an LM guide rail. The third driver 233 may be composed of a ball screw and a servo motor. If necessary, the third driver 233 may be a hydraulic or pneumatic cylinder.

The elevator 240 is installed on the slider 220 to be movable up and down and supports and horizontally maintains a machining tool that is sent to the magazine or a replacement tool that is taken out of the magazine when tools are exchanged.

As shown in FIGS. 4 to 6, the elevator 240 of the tool support 170 of the automatic tool changer according to the present disclosure includes a housing 241, a road 242, a compensator 243, and a fourth driver 244.

The housing 241 is formed on the slider 220 and forms the external shape of the elevator.

The rod 242 is installed in the housing 241 to be movable up and down by the fourth driver 244 to be described below.

The compensator 243 is coupled to an end of the rod 242 and supports and horizontally maintains a machining tool that is put into a gripper 134 of the magazine 130 or a replacement tool that is taken out of a gripper 134 of the magazine 130 when tools are exchanged. That is, the compensator prevents sagging of tools by supporting and horizontally maintaining an end of each of the tools that are changed, in order to prevent the tools from being changed wrong due to sagging in the gravity direction of a side of the tools when the tools are long and heavy tools.

The fourth driver 244 generates power for moving up and down the rod 242 in response to a signal from the controller. Though not necessarily limited thereto, the fourth driver may be pneumatic or hydraulic cylinder.

As described above, since tools are accurately clamped at the grippers of the magazine or the tool post by the tool support in the automatic cool changer according to the present disclosure, it is possible to improve machining precision of the machine tool, reduce vibration or noise, and increase the lifespan of tools by preventing the tools from being worn or damaged.

A method of controlling the automatic tool changer according to the present disclosure is described with reference to FIG. 22. As shown in FIG. 2, a method of controlling the automatic tool changer according to the present disclosure includes: a door unit-opening step (S1), a step wherein the tool post and the magazine are horizontally moved close to each other (S2), a step wherein the magazine is moved forward toward the inclination axis (S3), a step wherein the tool support is moved up (S4), a step wherein the tool post is horizontally moved away from the magazine (S5), a step wherein the tool support is moved down (S6), a step wherein the magazine is rotated (S7), a step wherein the tool post is horizontally moved back close to the magazine (S8), a step wherein the tool support is moved up again (S9), a step wherein the magazine is moved backward toward the inclination axis (S10), a step wherein the tool support is moved down again (S11), a step wherein the tool post and the magazine are horizontally moved away from each other (S12), and a door unit-closing step (S13).

Figure 7:
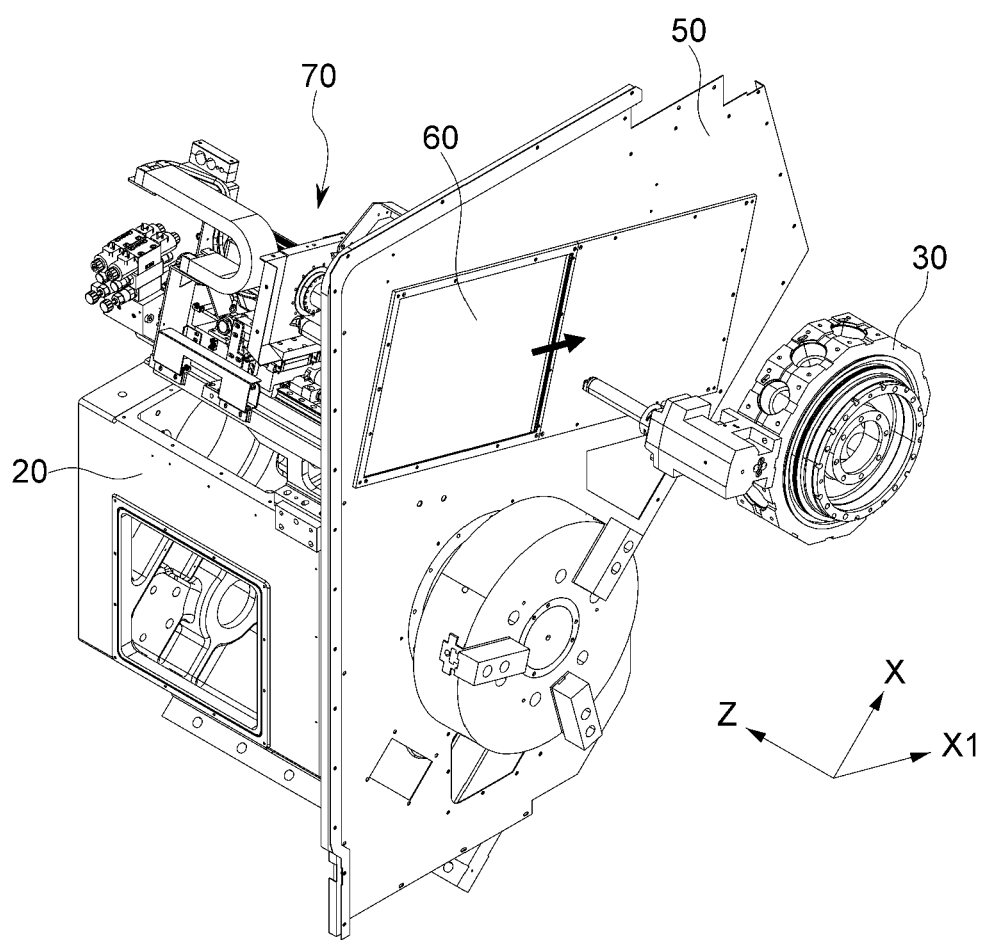
FIGS. 7 to 21 show an operation process of changing tools by a machine tool including the automatic tool changer according to the present disclosure.

As shown in FIGS. 7 and 22, the door unit is opened in response to a signal from the controller to exchange the machining tool mounted on the tool post and a replacement tool held on the magazine using the automatic tool changer.

As shown in FIGS. 8 to 10, and FIG. 22, after the door unit-opening step (S1), the tool post and the magazine are horizontally moved close to each other in response to a signal from the controller. That is, when the actuating mechanism is operated, the tool post is moved in the Z-axial direction to the setup position to be close to the door unit (or the magazine). When the first moving assembly is operated, the magazine is moved in the Z-axial direction from the initial position to the exchange position to partially protrude to the machining region through the open portion of the door unit to be close to the door unit (or the tool post).

Figure 11:
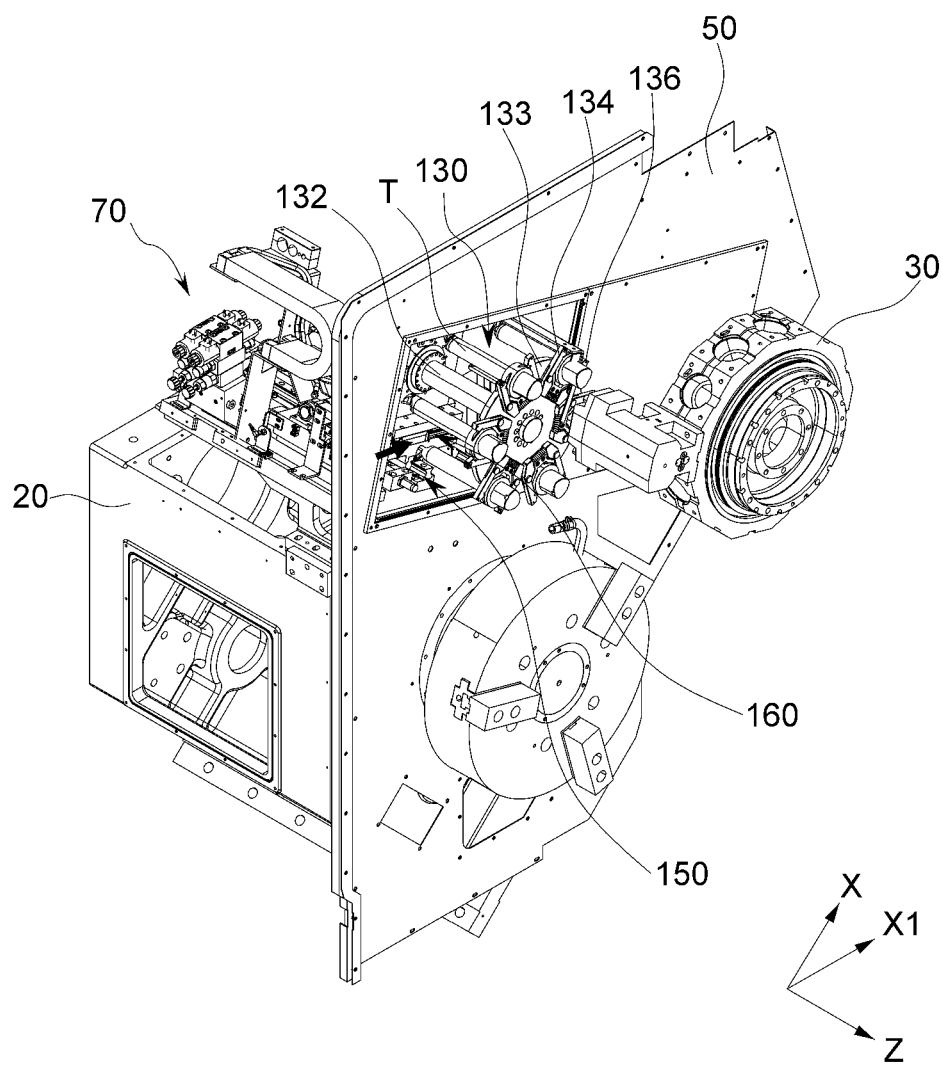
Figure 12:
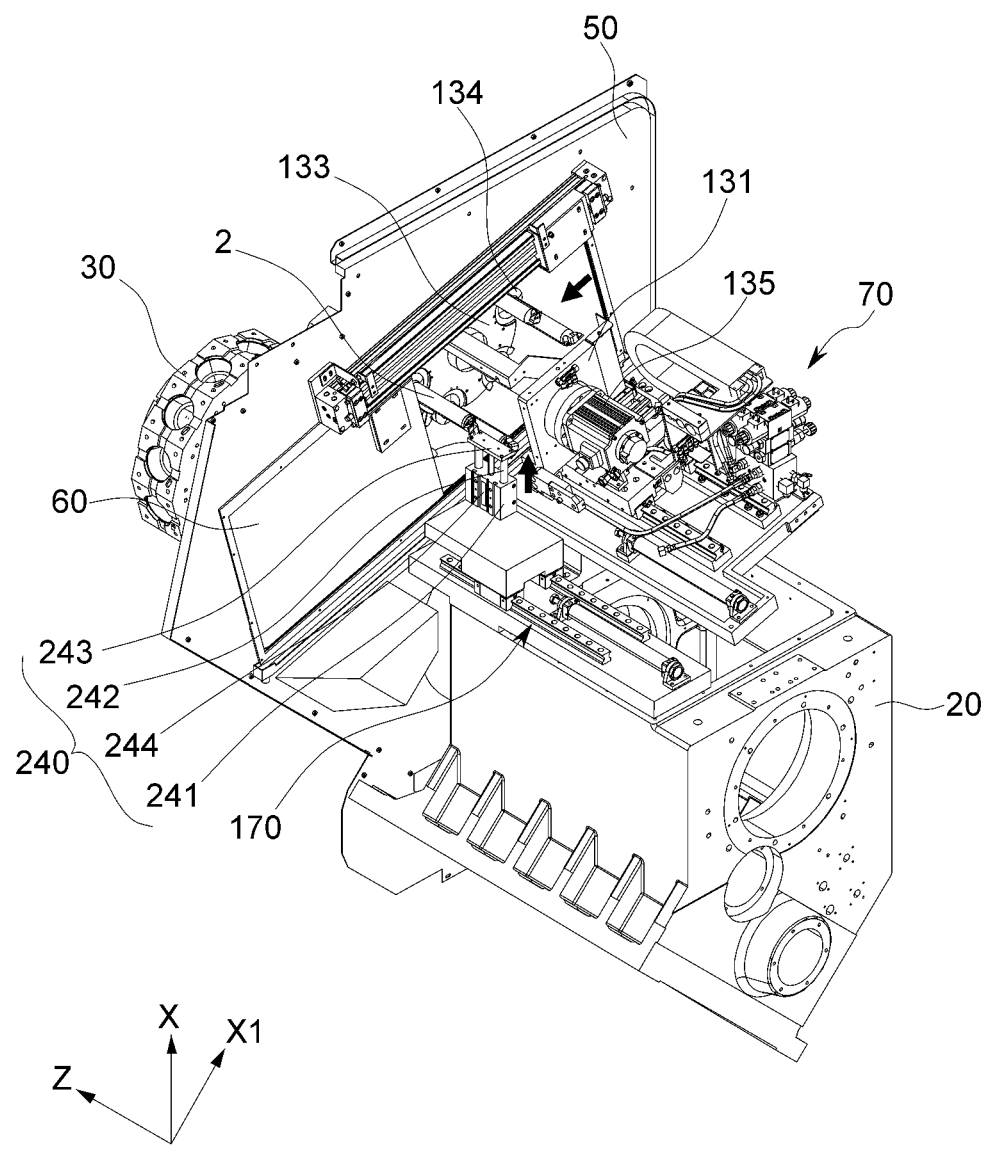

As shown in FIGS. 11, 12, and 22, after the step wherein the tool post and the magazine are horizontally moved close to each other (S2), the magazine is moved forward in the direction of the inclination axis (X1) such that a gripper holding a machining tool of the magazine clamps the machining tool mounted on the tool post. That is, the magazine is moved forward close to the tool post in the X1-axial direction, thereby moving to the exchange position.

As shown in FIGS. 11, 12, and 22, after the step wherein the magazine is moved forward toward the inclination axis (S3), the tool support is moved up to support the machining tool clamped by a machining tool gripper of the magazine. That is, in order to support a machining tool when the machining tool is clamped by a machining tool gripper of the magazine, the rod of the elevator of the tool support moves up and supports the machining tool in response to a signal from the controller.

Figure 13:
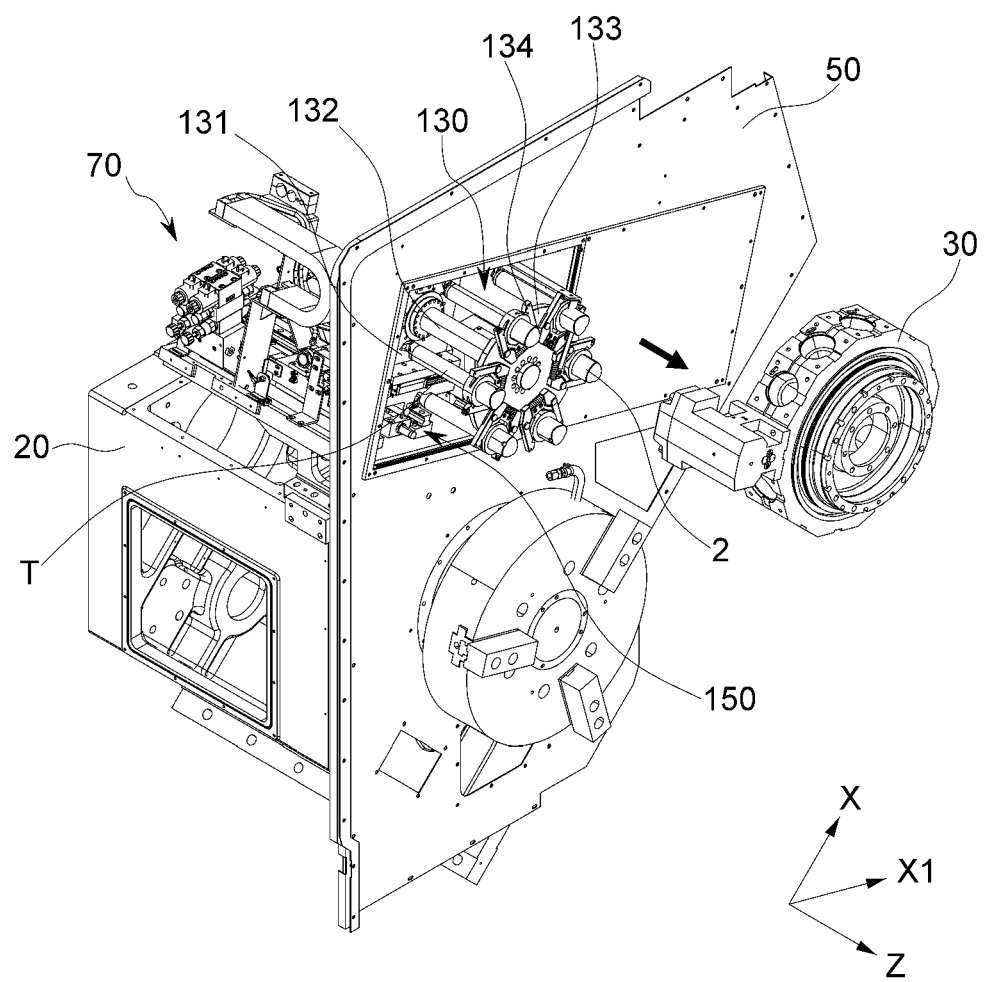
Figure 14:
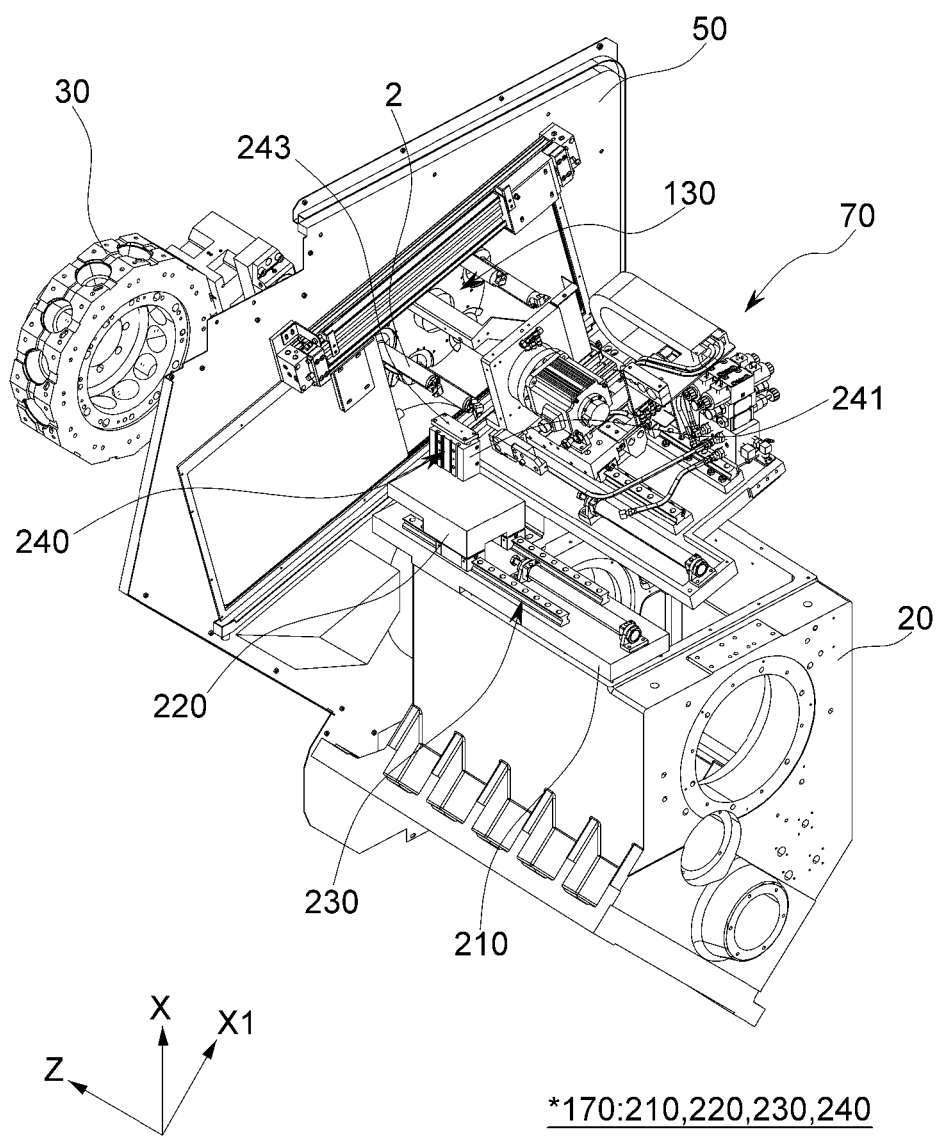

As shown in FIGS. 13, 14, and 22, after the step wherein the tool support is moved up (S4), the tool post is horizontally moved away from the magazine to unclamp the machining tool. That is, the tool post is moved way from the magazine and the door unit to the preparation position in the Z-axial direction.

As shown in FIGS. 13, 14, and 22, after the step wherein the tool post is horizontally moved away from the magazine (S5), the tool support is moved down. That is, the rod of the elevator of the tool support is moved down to prevent a collision due to mechanical interference.

Figure 15:
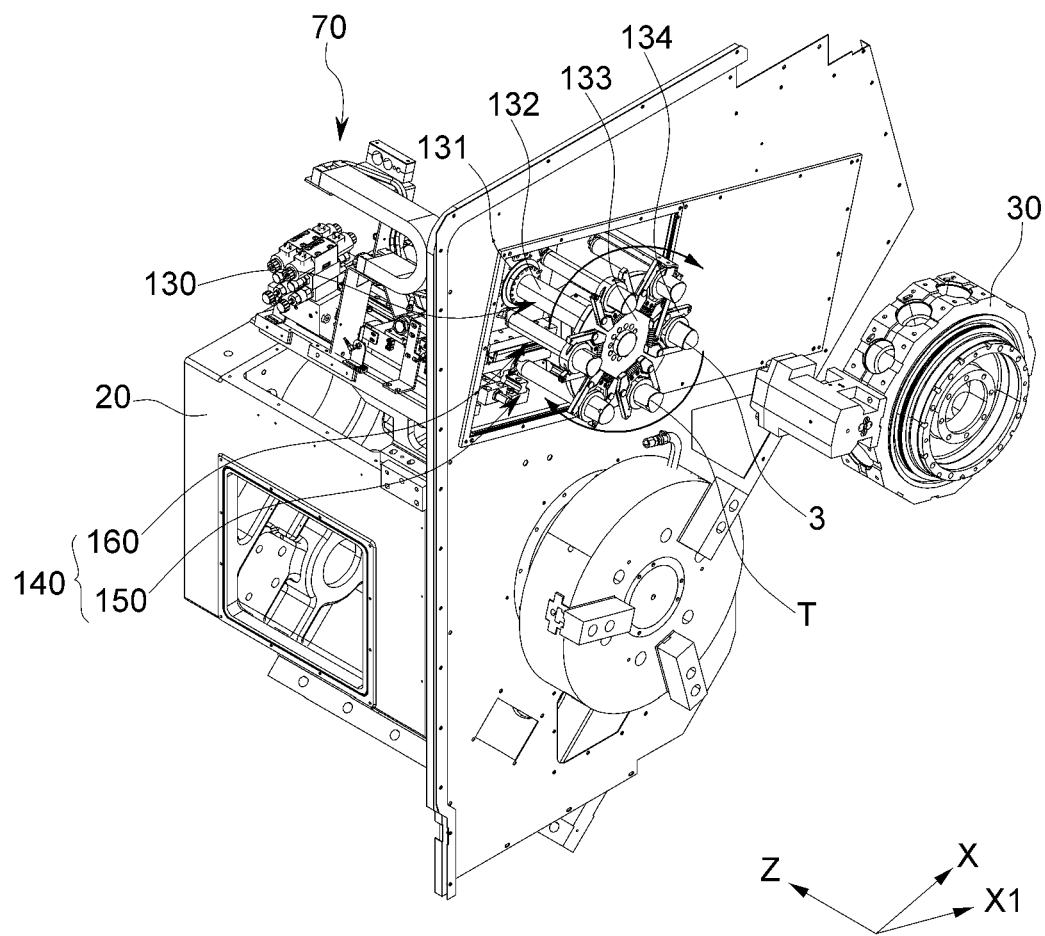

As shown in FIGS. 15 and 22, after the step wherein the tool support is moved down (S6), the magazine is rotated such that the gripper holding a replacement tool to be positioned at the exchange position. That is, the rotator of the magazine is operated and the magazine is rotated such that the gripper holding a replacement tool required in accordance with a machining program of the magazine is positioned at the exchange position.

Figure 16:
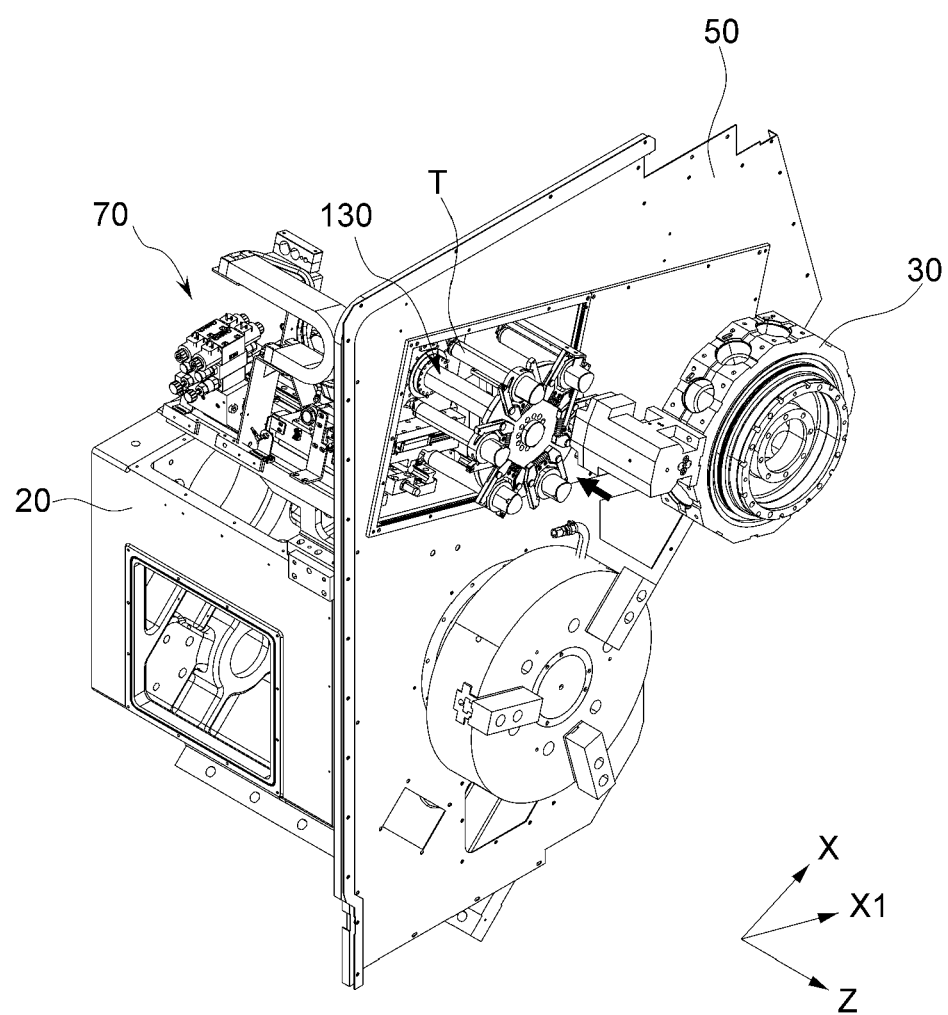

As shown in FIGS. 16 and 22, after the step wherein the magazine is rotated (S7), the tool post is horizontally moved back close to the magazine to clamp the replacement tool. That is, the tool post is horizontally moved back close to the magazine (or the door unit).

Figure 17:
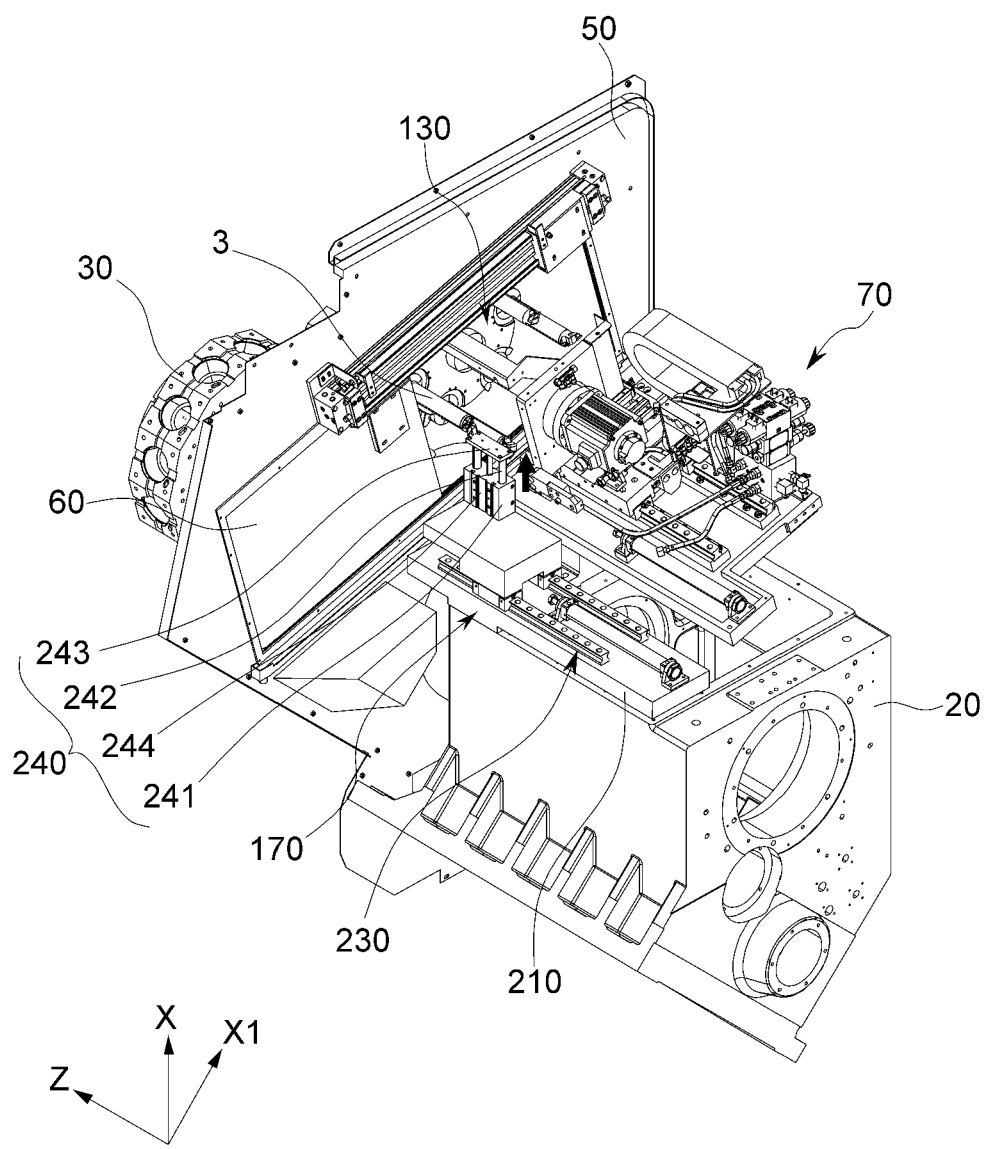

As shown in FIGS. 17 and 22, after the step wherein the tool is horizontally moved back close to the magazine (S8), the tool support is moved up again to support the replacement tool clamped by the replacement tool gripper of the magazine. That is, the rod of the elevator of the tool support is moved up again, thereby stably supporting the replacement tool.

Figure 18:
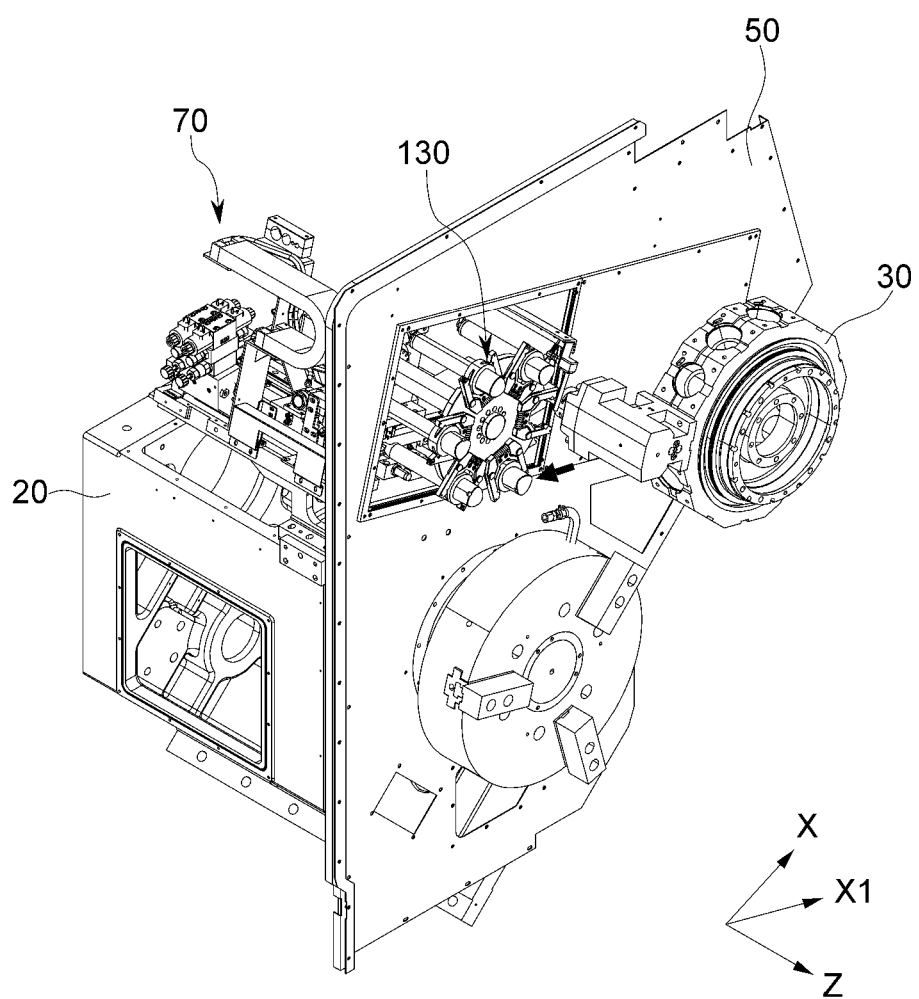
Figure 19:
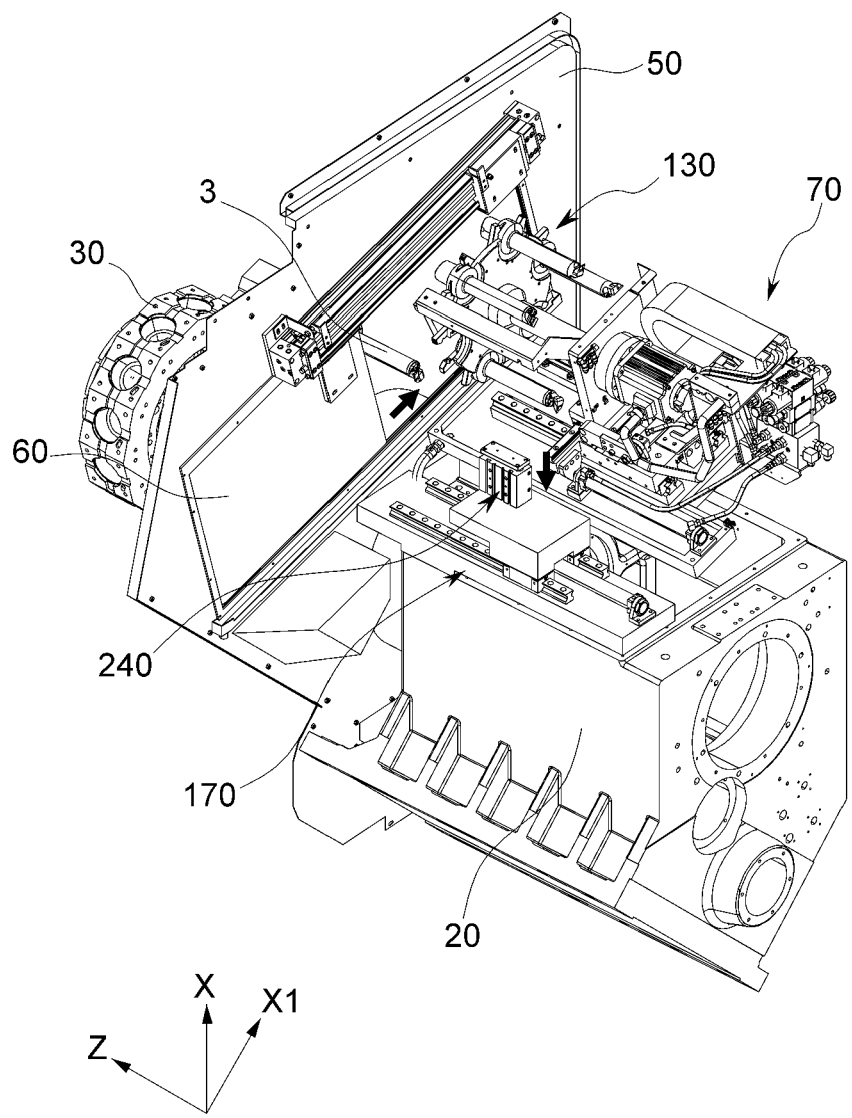

As shown in FIGS. 18, 19, and 22, after the step wherein the tool support is moved up again (S9), the magazine is moved backward toward the inclination axis such that the gripper clamping the replacement tool of the magazine unclamps the replacement tool to be mounted on the tool post. That is, the magazine is moved backward away from the tool post toward the inclination axis, thereby moving to the initial position.

As shown in FIGS. 18, 19, and 22, after the step wherein the magazine is moved backward toward the inclination axis (S10), the tool support is moved down again. That is, the rod of the elevator of the tool support is moved down again to prevent breakage or damage by mechanical interference due to movement of the tool post and the magazine.

Figure 20:
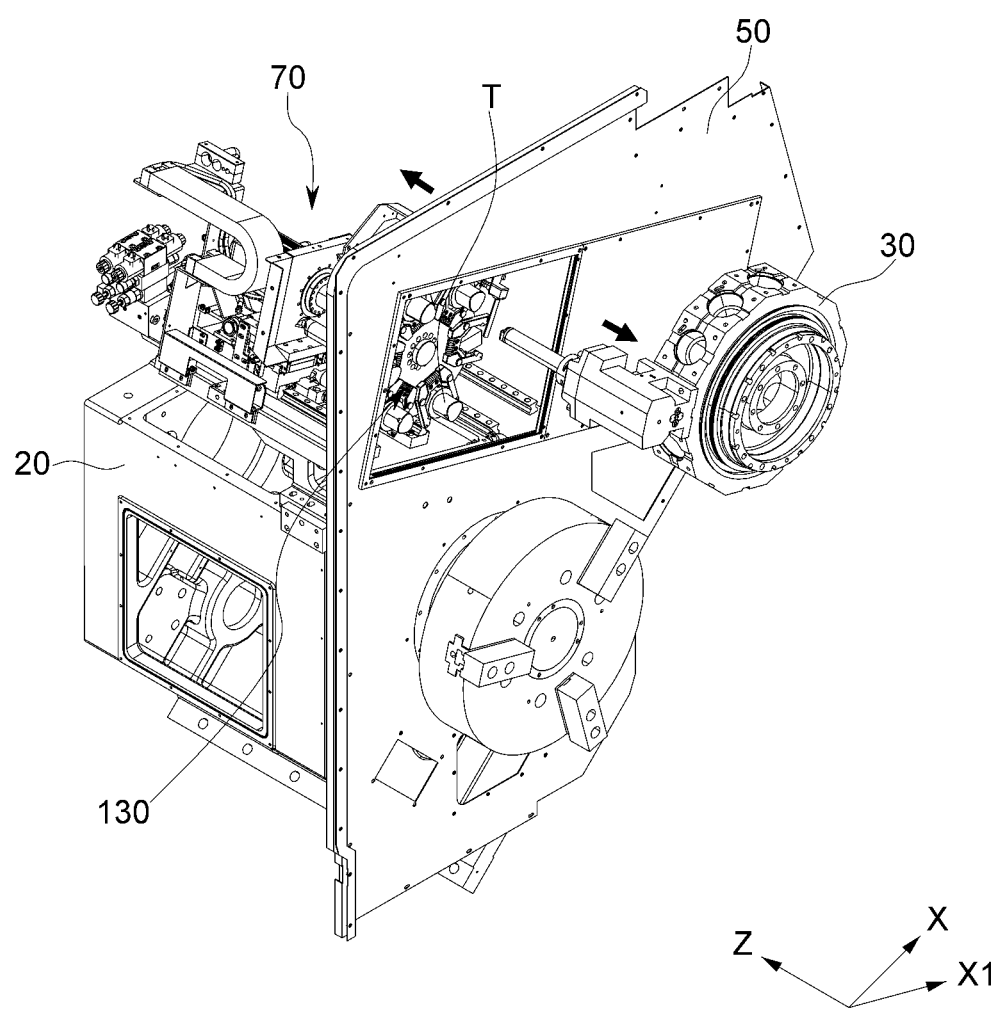
Figure 21:
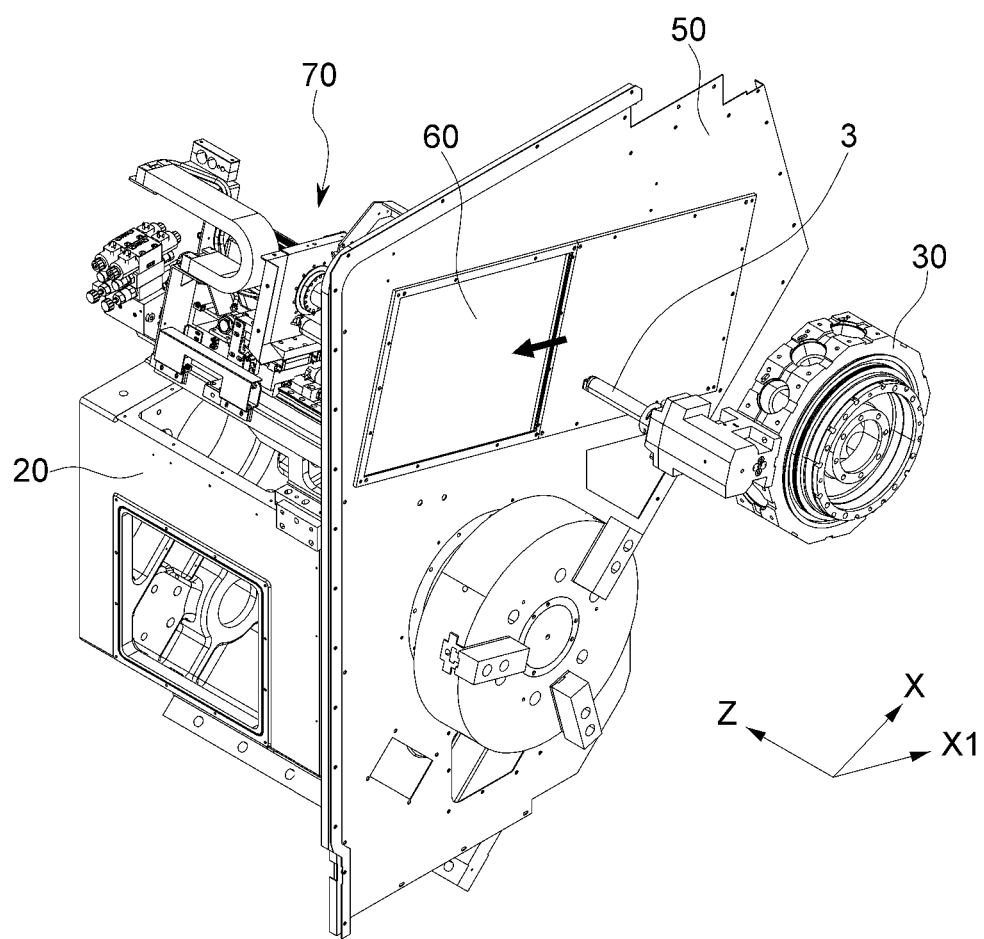
Figure 22:
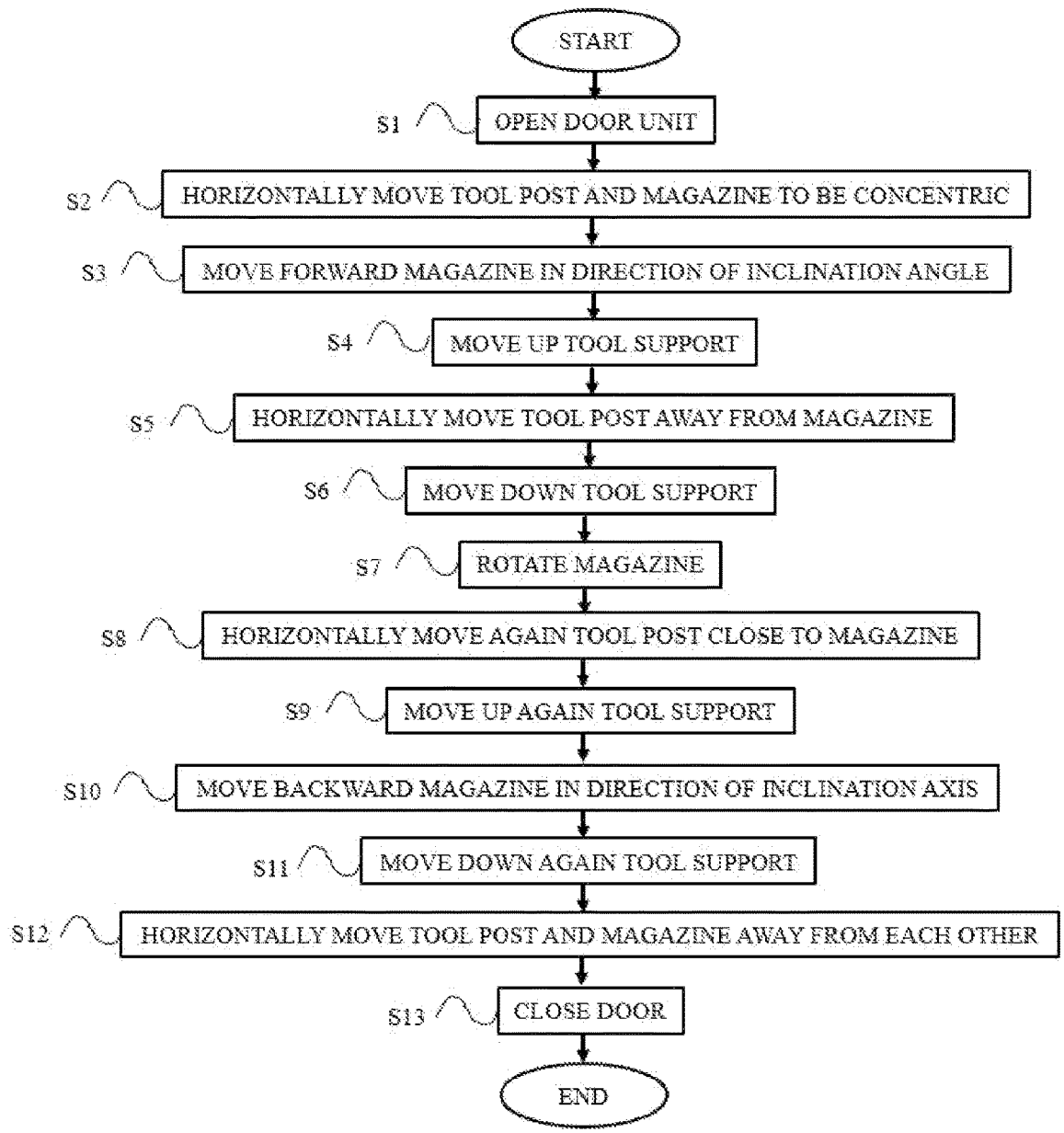
FIG. 22 is a flowchart showing a method of controlling the automatic tool changer according to the present disclosure.

As shown in FIGS. 20 to 22, after the step wherein the tool support is moved down (S11), the tool and the magazine are horizontally moved away from each other. That is, the magazine is horizontally moved away from the tool post and the door unit to the initial position and the tool post is also horizontally moved away from the door unit and the magazine and returns to the initial position for machining work.

As shown in FIGS. 21 and 22, after the step wherein the tool post and the magazine are horizontally moved away from each other (S12), the door unit is closed to prevent chips or cutting oil from flying to the non-machining region from the machining region when a workpiece is machined.

Accordingly, since the method of controlling the automatic tool changer according to the present disclosure automatically quickly exchanges a tool held on the magazine and the tool mounted on the tool post, the non-machining time of the machine tool is minimized. Therefore, it is possible to maximize the productivity by the machine tool, improve reliability and stability of the machine tool, and improve convenience for workers.

The operation principle of the automatic tool changer according to the present disclosure, the method of controlling the automatic tool changer, and the machine tool including the automatic tool changer, that is, the tool exchange process by the tool post and the magazine is described in detail with reference to FIGS. 7 to 22.

As shown in FIG. 7, the door unit is opened in response to a signal from the controller.

Figure 8:
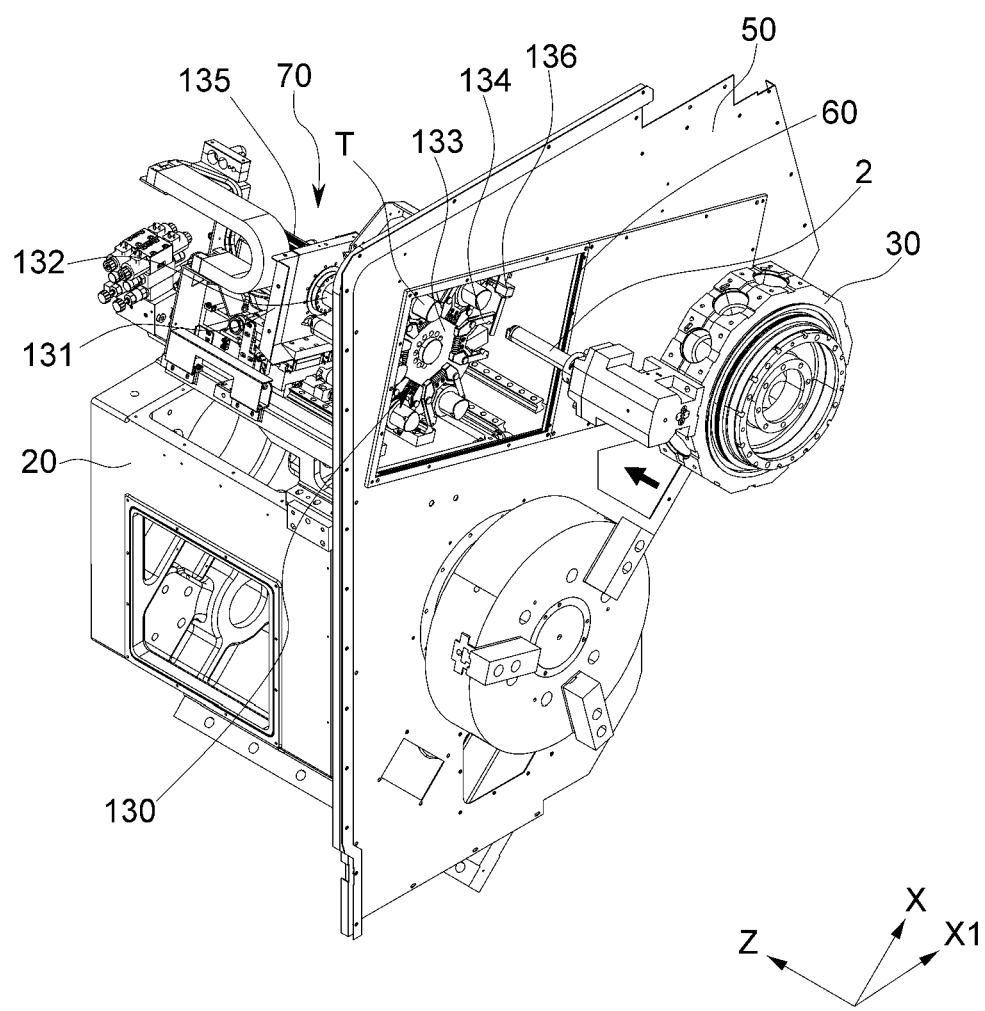

As shown in FIG. 8, when the door unit is opened in response to a signal from the controller, the actuating mechanism simultaneously operates in response to a signal from the controller, whereby the tool post is moved in the Z-axial direction (horizontally) to the setup position to be close to the open portion of the door unit.

Figure 9:
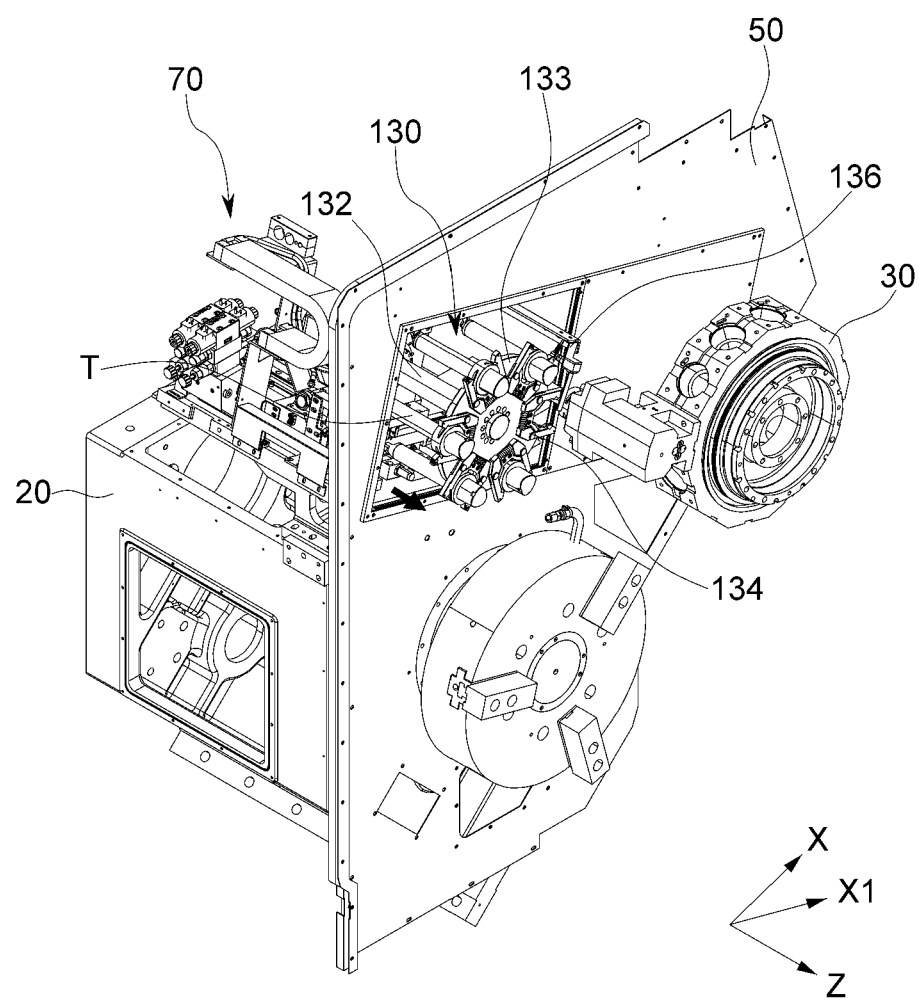
Figure 10:
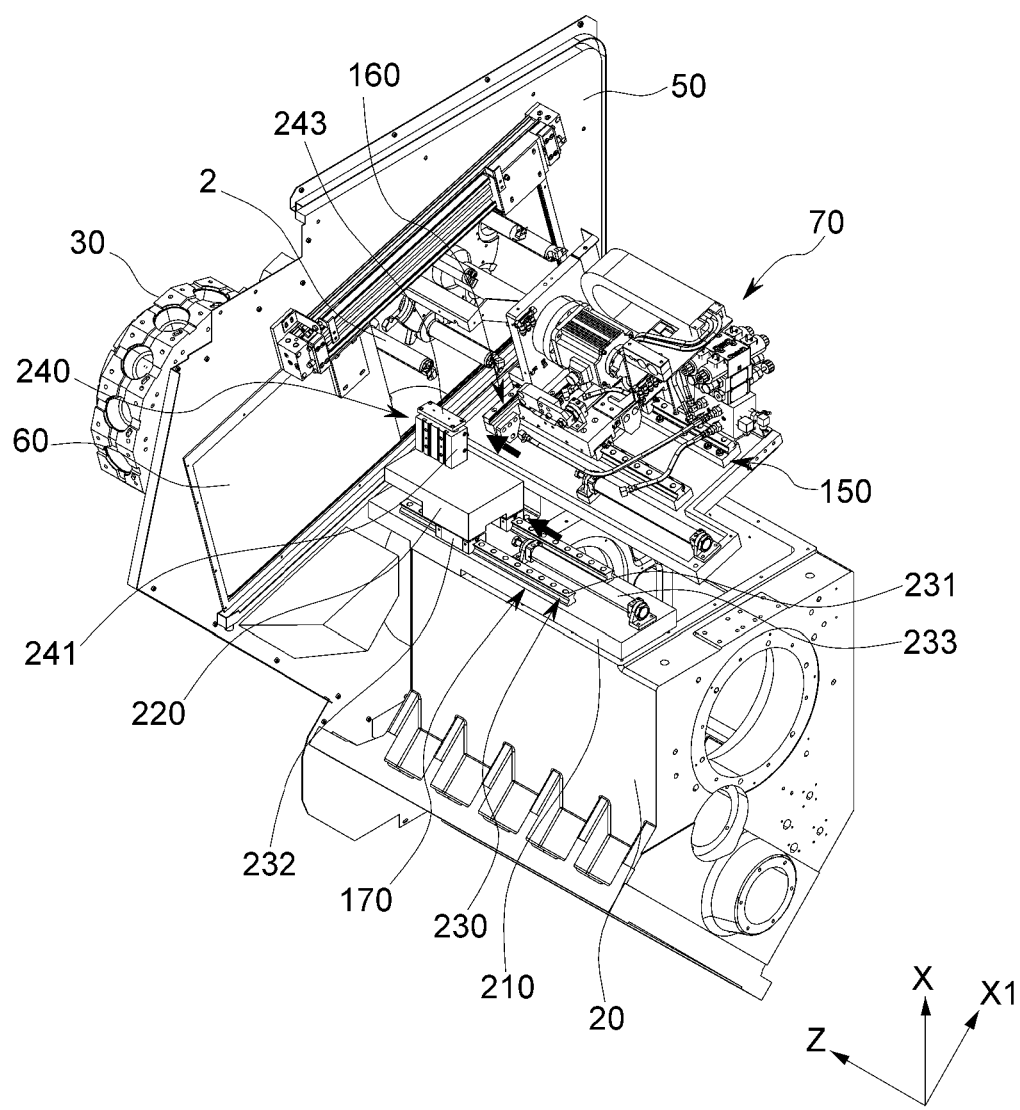

As shown in FIGS. 9 and 10, as the tool post is horizontally moved close to the open portion of the door unit, the first moving assembly operates in response to a signal from the controller, whereby the support is moved forward in the Z-axial direction (horizontally) and the magazine is moved to the exchange position from the initial position to partially protrude to the machining region through the open portion of the door. That is, the magazine and the automatic tool changer are moved close to each other when tools are exchanged.

As shown in FIGS. 11 and 12, the second moving assembly operates in response to a signal from the controller, whereby the magazine is moved forward in the X1-axial direction (in the direction of the inclination axis). That is, the magazine is moved forward close to the tool post in the X1-axial direction, thereby moving to the exchange position. Accordingly, the machining tool at the tool post is clamped by an empty gripper of the magazine.

As shown in FIGS. 11 and 12, when the machining tool at the tool post is clamped by the empty gripper of the magazine, the fourth driver operates in response to a signal from the controller, whereby the rod of the elevator is moved up and the slider supports and horizontally maintains the machining tool clamped by the gripper of the magazine. Thereafter, the checker confirms that the machining tool at the tool post has been accurately clamped by the empty gripper of the magazine and transmits a corresponding signal to the controller.

As shown in FIGS. 13 and 14, when the controller receives the normal-clamping signal from the checker, the tool post is moved in the Z-axial direction in response to a signal from the controller. That is, the tool post is moved away from the door unit to the preparation position.

As shown in FIGS. 13 and 14, as the tool post is moved away from the door unit, the fourth driver operates in response to a signal from the controller and the rod of the elevator is moved down.

As shown in FIG. 15, as the rod of the elevator is moved down, the rotator of the magazine operates in response to a signal from the controller such that the gripper holding a replacement tool required in accordance with a machining program is moved to the exchange position, whereby the tool holder is rotated. That is, the tool holder is rotated with the magazine at the standby position, whereby the gripper holding the replacement tool is moved to the exchange position.

As shown in FIG. 16, after the tool holder is rotated, the tool post is horizontally moved back close to the door in response to a signal from the controller. That is, the tool post is moved back to the setup position.

As shown in FIG. 17, when the tool post is moved back to the setup position, the fourth driver operates in response to a signal from the controller, whereby the rod of the elevator is moved up and the slider supports and horizontally maintains the replacement tool clamped by the gripper of the magazine.

As shown in FIGS. 18 and 19, after the rod moves up and horizontally maintains the replacement tool, the second moving assembly operates in response to a signal from the controller, whereby the magazine is moved backward in the X1-axial direction (in the direction of the inclination axis). That is, the magazine is moved backward away from the tool post in the X1-axial direction, thereby moving to the initial position. Accordingly, the replacement tool in the gripper of the magazine is mounted onto the tool post, whereby the tool post clamps the replacement tool.

As shown in FIGS. 18 and 19, as the tool support clamps the replacement tool and the magazine is moved backward in the X1-axial direction, the checker confirms that the replacement tool has been unclamped from the gripper of the magazine which had clamped the replacement tool and transmits a corresponding signal to the controller. The fourth driver operates in response to a signal from the controller, whereby the rod of the elevator is moved down.

As shown in FIG. 20, after the magazine is moved backward in the direction of the inclination axis and the rod is moved down, the first moving assembly operates in response to a signal from the controller, whereby the magazine is horizontally moved away from the door unit. Further, the actuating mechanism operates in response to a signal from the controller, whereby the tool post is also horizontally moved away from the door unit. That is, the magazine is moved backward in the Z-axial direction to the initial position and the tool post is also returned to the original position for machining work in response to a signal from the controller.

As shown in FIG. 21, while the magazine is moved to the initial position and the tool post is returned to the original position, the door unit is closed in response to a signal from the controller to prevent chips or cutting oil from flying to the non-machining region from the machining region when a workpiece is machined.

As described above, according to the automatic tool changer of a machine tool of the present disclosure and a machine tool including the automatic tool changer, the tool post and the magazine both move and automatically exchange tools on a horizontal type turning center such as a lathe, the magazine is horizontally installed to be parallel with the tool post, and tools are horizontally disposed to be parallel with the tool post. Accordingly, the tool mounted on the tool post and a tool held on the magazine are automatically quickly exchanged, so the time and manpower for exchanging tools are reduced, the productivity by the machine tool is maximized by minimizing the non-machining time of the machine tool, reliability and stability of the machine tool are improved, and the manufacturing cost is decreased by reducing the size of the machine tool. Further, since the automatic tool changer is installed in the non-machining region, damage or breakage due to chips or cutting oil is prevented, whereby it is possible to reduce the maintenance cost and maintenance time, provide convenience for workers, and prevent safety accidents that occur when tools are exchanged.

Although exemplary embodiments of the present disclosure were described above, it should be understood that the present disclosure may be changed and modified in various ways by those skilled in the art without departing from the spirit and scope of the present disclosure described in the following claims. Therefore, the technical scope of the present disclosure is not limited to the exemplary embodiments described herein, but should be determined by claims.

The invention claimed is:

1. An automatic tool changer of a machine tool, comprising:
    a base that is installed on top of a spindle of the machine tool, wherein the spindle is configured to hold a workpiece;
    a support that is installed on the base such that the support is displaceable in a first horizontal direction;
    a magazine that is configured to hold a plurality of tools, wherein the magazine is installed on the support such that the magazine is displaceable along with the support in the first horizontal direction; and
    a tool support that is configured to support a selected tool of the plurality of tools during a tool exchange,
    wherein the tool support comprises a guide; a slider that is installed on the guide so as to be displaceable in the first horizontal direction; and an elevator that is installed on the slider such that the elevator is displaceable along with the slider in the first horizontal direction, and wherein a compensator of the elevator is configured to be moved up and down with respect to the slider so as to contact and support a first end of the selected tool;
    wherein, during the tool exchange, an opposing second end of the selected tool is clamped by a first gripper of the magazine, and the first end of the selected tool is contacted and supported by the compensator of the elevator so as to maintain the selected tool in an orientation in which a longitudinal axis of the selected tool extends horizontally; and
    wherein the magazine is configured to be moved toward a tool post of the machine tool such that the selected tool of the plurality of tools is directly exchanged from the magazine to the tool post.

2. The automatic tool changer of claim 1,
    wherein the magazine is installed so as to be rotatable about a horizontally extending rotation axis, and
    wherein the plurality of tools held on the magazine are horizontally disposed.

3. The automatic tool changer of claim 1, wherein the base includes a coupling part that is disposed over the spindle.

4. The automatic tool changer of claim 3, wherein the base further includes:
    an inclination part, which is installed on top of the spindle so as to be in parallel with or at an angle with respect to a vertical feeding axis of the tool post, wherein
    the coupling part is installed on the inclination part.

5. The automatic tool changer of claim 1, further comprising a moving mechanism, wherein the moving mechanism includes:
    a first moving assembly that is disposed on the base and that is configured to straightly reciprocate the support in the first horizontal direction; and
    a second moving assembly that crosses the first moving assembly at a right angle on the support and that is configured to straightly reciprocate the magazine.

6. The automatic tool changer of claim 5, wherein the magazine includes:
    a body that is coupled to the second moving assembly;
    a rotary shaft that extends from the body such that a longitudinal axis of the shaft extends parallel to the first horizontal direction;
    a tool disc having a plurality of grippers configured to hold the plurality of tools circumferentially around a rotation center of the rotary shaft, wherein the tool disc is coupled to the rotary shaft and is configured to be rotated by rotation of the rotary shaft; and
    a rotator configured to generate power for rotating the rotary shaft.

7. The automatic tool changer of claim 5, wherein the magazine further includes a checker that is configured to check whether the selected tool is clamped during the tool exchange.

8. The automatic tool changer of claim 1, wherein the tool support is configured to support the selected tool of the plurality of tools held on the magazine by moving independently from the magazine during the tool exchange.

9. The automatic tool changer of claim 8, wherein the tool support further includes:
    a slider moving assembly that is disposed on the guide, and that is configured to straightly reciprocate the slider in the first horizontal direction.

10. The automatic tool changer of claim 9, wherein the elevator includes:
    a housing formed on the slider;
    a rod installed in the housing to be movable up and down;
    the compensator that is coupled to an end of the rod; and
    a driver configured to generate power for moving up and down the rod and the compensator that is coupled to the end of the rod.

11. A method of controlling the automatic tool changer of claim 1, the method comprising:
    a step of providing the automatic tool changer of claim 1;
    a step wherein the magazine of the automatic tool changer is horizontally moved toward a tool post of a machine tool;
    a step wherein the magazine is moved forward in a direction of an inclination axis so that a second gripper of the magazine clamps a tool mounted on the tool post;
    a step wherein the magazine is rotated so that the first gripper holding the selected tool is positioned at an exchange position;
    a step wherein the magazine is moved backward in the direction of the inclination axis so that the first gripper clamping the selected tool of the magazine unclamps the selected tool after the selected tool has been mounted onto the tool post; and a step in which the magazine is horizontally moved away from the tool post in the first horizontal direction.

12. The method of claim 11, further comprising:
a step in which the compensator is moved up to support the tool mounted on the tool post after the step in which the magazine is moved forward in the direction of the inclination axis;
a step in which the compensator is moved down after the tool post is horizontally moved away from the magazine;
a step in which the compensator is moved up again to support the first end of the selected tool clamped by the first gripper of the magazine after the tool post is horizontally moved toward the magazine; and
a step in which the compensator is moved down again after the step in which the magazine is moved backward in the direction of the inclination axis.

13. A machine tool comprising the automatic tool changer of claim 1.

14. The machine tool of claim 13, further comprising:
a bed;
a spindle that is installed on the bed, the spindle being configured to hold and rotate a workpiece;
a tool post on which a tool is mounted, the tool post being movably installed on the bed and being configured to machine the workpiece;
an actuating mechanism that is configured to feed the tool post;
a cover that is configured to separate a machining region and a non-machining region, wherein the workpiece is machined in the machining region; and
a door unit that is installed on the cover and that is configured to open and close by sliding.

* * * * *